United States Patent
Nagahama et al.

(10) Patent No.: US 10,958,199 B2
(45) Date of Patent: Mar. 23, 2021

(54) MOVEMENT, ELECTRONIC TIMEPIECE, AND MOTOR DRIVE CONTROL METHOD

(71) Applicant: Seiko Epson Corporation, Tokyo (JP)

(72) Inventors: Reiko Nagahama, Shiojiri (JP); Takashi Kawaguchi, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/520,500

(22) Filed: Jul. 24, 2019

(65) Prior Publication Data
US 2020/0036309 A1    Jan. 30, 2020

(30) Foreign Application Priority Data

Jul. 25, 2018 (JP) .............................. JP2018-139338

(51) Int. Cl.
*H02P 8/12* (2006.01)
*G04C 3/14* (2006.01)
*H02P 8/16* (2006.01)
*H02P 8/02* (2006.01)

(52) U.S. Cl.
CPC ............... *H02P 8/12* (2013.01); *G04C 3/143* (2013.01); *H02P 8/02* (2013.01); *H02P 8/16* (2013.01)

(58) Field of Classification Search
CPC .......... G04C 3/143; G04C 3/14; G04C 3/146; H02P 8/02
See application file for complete search history.

(56) References Cited

U.S. PATENT DOCUMENTS

| 4,542,329 A | 9/1985 | Tu Xuan |
| 2010/0001673 A1 | 1/2010 | Cardoletti et al. |
| 2017/0277135 A1* | 9/2017 | Shirao ...................... G04G 5/00 |
| 2017/0366123 A1* | 12/2017 | Saw ........................ H02P 6/182 |

FOREIGN PATENT DOCUMENTS

| JP | H02-33108 B2 | 7/1990 |
| JP | 2003-259692 A | 9/2003 |
| JP | 4954284 B2 | 6/2012 |

* cited by examiner

*Primary Examiner* — Muhammad S Islam
(74) *Attorney, Agent, or Firm* — Harness, Dickey & Pierce, P.L.C.

(57) ABSTRACT

Provided is a motor drive circuit capable of driving a stepper motor even if the load on the stepper motor varies. A motor drive circuit has a first drive circuit that outputs a first drive signal to the driver; a second drive circuit that outputs a second drive signal to the driver; a controller that controls the first drive circuit and second drive circuit. The first drive circuit is configured to output a first drive signal based on the current value of current flow of a coil of a stepper motor. The second drive circuit is configured to output multiple types of second drive signals that differ by the supply time of drive current supplied to the coil. Based on a result of driving by the first drive circuit, the controller selects the type of second drive signal the second drive circuit outputs.

12 Claims, 20 Drawing Sheets

MOVEMENT, ELECTRONIC TIMEPIECE, AND MOTOR DRIVE CONTROL METHOD

CROSS REFERENCE TO RELATED APPLICATIONS

This application is based upon Japanese Patent Application 2018-139338 filed on Jul. 25, 2018, the entire contents of which are incorporated by reference herein.

BACKGROUND

1. Technical Field

The present invention relates to a movement, an electronic timepiece, and a motor drive control method.

2. Related Art

To drive a stepper motor by a battery in an analog electronic timepiece, the energy of the signal waveform in the drive pulse that drives the stepper motor is preferably minimized to reduce power consumption when driving the motor. However, the rotor of the motor will not turn if the energy is too low. To solve this problem, JP-A-2003-259692 discloses an analog electronic timepiece that has a rotor rotation detection device, conserves energy by gradually reducing the pulse width of the drive pulse when the rotor turns, and when the rotor does not turn, outputs a compensating drive pulse with a greater pulse width than the drive pulse to reliably turn the rotor.

However, when the pulse width of the drive pulse is reduced to reduce energy, the drive power also decreases, and motor operation is easily affected if the load on the motor varies. More particularly, because the load on the motor increases when the temperature of the environment in which the electronic timepiece is used changes, and when the electronic timepiece is left unused for an extended time and the lubricant of the bearings in the wheel train deteriorates, for example, driving the motor may not be possible by the default pulse setting. The load on the motor also increases when the hands driven by the motor are hands that are thicker or longer, or are hands that are heavier, than the hands anticipated for the design setting, and the energy of the drive pulse may therefore be insufficient and unable to drive the motor.

SUMMARY

A motor drive circuit for driving a stepper motor according to the invention includes: a driver that supplies to the coil of a stepper motor a drive current corresponding to an input drive signal; a current detection circuit that detects a current value of current flow through the coil; a first drive circuit that outputs a first drive signal to the driver; a second drive circuit that outputs a second drive signal to the driver; a controller that controls the first drive circuit and second drive circuit. The first drive circuit is configured to output a first drive signal based on the current value detected by the current detection signal. The second drive circuit is configured to output as a second drive signal multiple types of drive signals that differ by the supply time of drive current supplied to the coil. Based on a result of driving by the first drive circuit, the controller selects the type of second drive signal the second drive circuit outputs.

In a motor drive circuit according to another aspect of the invention, the second drive signal includes a first fixed pulse and a second fixed pulse with a pulse width smaller than the first fixed pulse; and the controller selects the first fixed pulse as the second drive signal when a result of driving by the first drive circuit satisfies a previously set first condition, and selects the second fixed pulse as the second drive signal when a result of driving by the first drive circuit satisfies a previously set second condition.

In a motor drive circuit according to another aspect of the invention, the second drive signal includes a first drive pulse, and a second drive pulse with a shorter drive current supply time than the first drive pulse; the second drive circuit has a rotation detection circuit configured to detection rotation of a rotor of the stepper motor; the controller selects the first drive pulse as the second drive signal when a result of driving by the first drive circuit satisfies a previously set first condition, and selects the second drive pulse as the second drive signal when a result of driving by the first drive circuit satisfies a previously set second condition; and the second drive circuit outputs a previously set compensating drive pulse when the rotation detection circuit detects the rotor is not rotating after the second drive signal is output.

In a motor drive circuit according to another aspect of the invention, the controller sets a rotation detection condition of the rotation detection circuit based on a result of driving by the first drive circuit.

In a motor drive circuit according to another aspect of the invention, the rotation detection condition the controller sets based on a result of driving the first drive circuit is a detection mask time, a detection pulse width, or a detection pulse count.

In a motor drive circuit according to another aspect of the invention, when the rotation detection circuit detects the rotor is not rotating, the controller drives the stepper motor by the first drive circuit after the compensating drive pulse is output and the rotor turns.

In a motor drive circuit according to another aspect of the invention, the controller drives the stepper motor by the first drive circuit at a regular interval, and after driving by the first drive circuit, drives the stepper motor by the second drive circuit until next driving by the first drive circuit.

Another aspect of the invention is a motor drive circuit that drives a stepper motor and includes: a driver configured to supply to the coil of the stepper motor a drive current corresponding to an input drive signal; a current detection circuit configured to detect a current value of current flow through the coil; a first drive circuit that outputs a first drive signal to the driver; a second drive circuit that outputs a second drive signal to the driver; a third drive circuit that outputs a third drive signal to the driver; and a controller that controls the first drive circuit, the second drive circuit, and the third drive circuit. The first drive circuit is configured to output the first drive signal based on the current value detected by the current detection circuit. The third drive circuit has a rotation detection circuit that detects rotation of the rotor of the stepper motor, and outputs a previously set compensating drive pulse when the rotation detection circuit does not detect rotation of the rotor after the third drive signal is output. The controller, based on a result of driving by the first drive circuit, selects driving by the second drive circuit or driving by the third drive circuit.

In a motor drive circuit according to another aspect of the invention, the controller detects an error (abnormal) state based on a result of driving by the first drive circuit.

In a motor drive circuit according to another aspect of the invention, the result of driving by the first drive circuit is a drive time from starting driving the stepper motor by the first drive circuit until a polarity switching condition is met.

In a motor drive circuit according to another aspect of the invention, the controller determines the first condition is satisfied when a drive time from starting driving the stepper motor by the first drive circuit to when a polarity switching condition is met is longer than a previously set evaluation time.

In a motor drive circuit according to another aspect of the invention, the controller determines the second condition is satisfied when a drive time from starting driving the stepper motor by the first drive circuit to when a polarity switching condition is met is less than or equal to than a previously set evaluation time.

Another aspect of the invention is a semiconductor device comprising a motor drive circuit for driving a stepper motor, and including a driver that supplies to the coil of a stepper motor a drive current corresponding to an input drive signal; a current detection circuit that detects a current value of current flow through the coil; a first drive circuit that outputs a first drive signal to the driver; a second drive circuit that outputs a second drive signal to the driver; a controller that controls the first drive circuit and second drive circuit. The first drive circuit is configured to output a first drive signal based on the current value detected by the current detection signal. The second drive circuit is configured to output as a second drive signal multiple types of drive signals that differ by the supply time of drive current supplied to the coil. Based on a result of driving by the first drive circuit, the controller selects the type of second drive signal the second drive circuit outputs.

Another aspect of the invention is a movement having a motor drive circuit for driving a stepper motor, and including a driver that supplies to the coil of a stepper motor a drive current corresponding to an input drive signal; a current detection circuit that detects a current value of current flow through the coil; a first drive circuit that outputs a first drive signal to the driver; a second drive circuit that outputs a second drive signal to the driver; a controller that controls the first drive circuit and second drive circuit. The first drive circuit is configured to output a first drive signal based on the current value detected by the current detection signal. The second drive circuit is configured to output as a second drive signal multiple types of drive signals that differ by the supply time of drive current supplied to the coil. Based on a result of driving by the first drive circuit, the controller selects the type of second drive signal the second drive circuit outputs.

Another aspect of the invention is an electronic timepiece having a motor drive circuit for driving a stepper motor, and including a driver that supplies to the coil of a stepper motor a drive current corresponding to an input drive signal; a current detection circuit that detects a current value of current flow through the coil; a first drive circuit that outputs a first drive signal to the driver; a second drive circuit that outputs a second drive signal to the driver; a controller that controls the first drive circuit and second drive circuit. The first drive circuit is configured to output a first drive signal based on the current value detected by the current detection signal. The second drive circuit is configured to output as a second drive signal multiple types of drive signals that differ by the supply time of drive current supplied to the coil. Based on a result of driving by the first drive circuit, the controller selects the type of second drive signal the second drive circuit outputs.

Another aspect of the invention is a motor drive control method of driving a stepper motor, including: a first drive step of detecting a current value of current flowing through the stepper motor, outputting a first drive signal to a driver that drives the stepper motor based on the detected current value, and driving the stepper motor; and a second drive step of selecting the type of a second drive signal based on a result of driving by the first drive step, outputting the selected second drive signal to the driver that drives the stepper motor, and driving the stepper motor; the first drive step executing at a regular interval.

Other objects and attainments together with a fuller understanding of the invention will become apparent and appreciated by referring to the following description and claims taken in conjunction with the accompanying drawings.

DESCRIPTION OF EMBODIMENTS

Embodiment 1

An electronic timepiece 1 according to the first embodiment of the invention is described below with reference to the accompanying figures.

This electronic timepiece 1 is a chronograph timepiece including in addition to a conventional 12-hour time indicator using hour, minute, and second hands, multiple display functions including a 24-hour time indicator, a date indicator, a chronograph seconds indicator, and a chronograph minute indicator.

Figure 1:
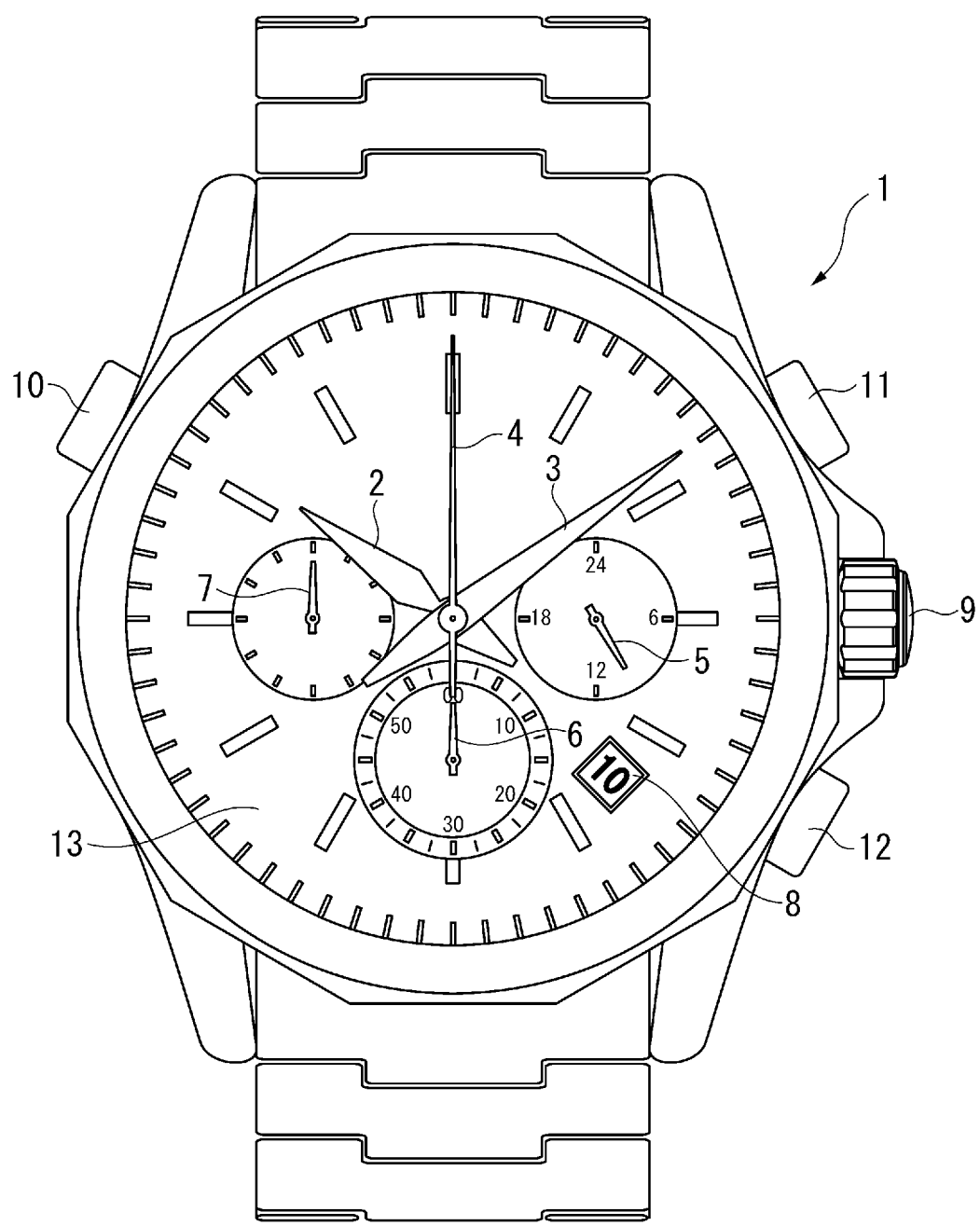
FIG. 1 is a front view of an electronic timepiece according to a first embodiment of the invention.

As shown in FIG. 1, the electronic timepiece 1 has an hour hand 2, minute hand 3, and second hand 4 for indicating the time in a 12-hour time display, a 24-hour hand 5 for indicating the hour in a 24-hour time display, a chronograph seconds hand 6 for indicating the chronograph seconds, a chronograph minute hand 7 for indicating the chronograph minute, and a date indicator 8 for displaying the date. The electronic timepiece 1 also has a crown 9, button A 10, button B 11, and button C 12 as operating members.

The hour hand 2, minute hand 3, and second hand 4 are mounted rotatably on a common arbor disposed substantially in the center of the dial 13 of the electronic timepiece 1.

The 24-hour hand 5 is disposed rotatably on a pivot independently from the hour hand 2, minute hand 3, and second hand 4 at a position offset to 3:00 from the center of the dial 13.

The chronograph seconds hand 6 is disposed rotatably on a pivot independently from the hour hand 2, minute hand 3, and second hand 4 at a position offset to 6:00 from the center of the dial 13.

The chronograph minute hand 7 is disposed rotatably on a pivot independently from the hour hand 2, minute hand 3, second hand 4, and chronograph seconds hand 6 at a position offset to 9:00 from the center of the dial 13.

While not shown in the figures, the electronic timepiece 1 also has a movement including a stepper motor for displaying time, a stepper motor for the chronograph, and a wheel train. The stepper motors are bipolar single-phase stepper motors.

There may be one or multiple stepper motors for displaying the time. The motor drive circuit of the stepper motor for displaying the time in the electronic timepiece 1 of the first embodiment is the same as used in a common timepiece, and description thereof is omitted.

The chronograph seconds hand 6 and chronograph minute hand 7 are driven by a stepper motor for the chronograph, and the motor drive circuit 20 is used for this stepper motor.

The motor drive circuit 20 for driving the stepper motor for the chronograph is described below in detail.

Figure 2:
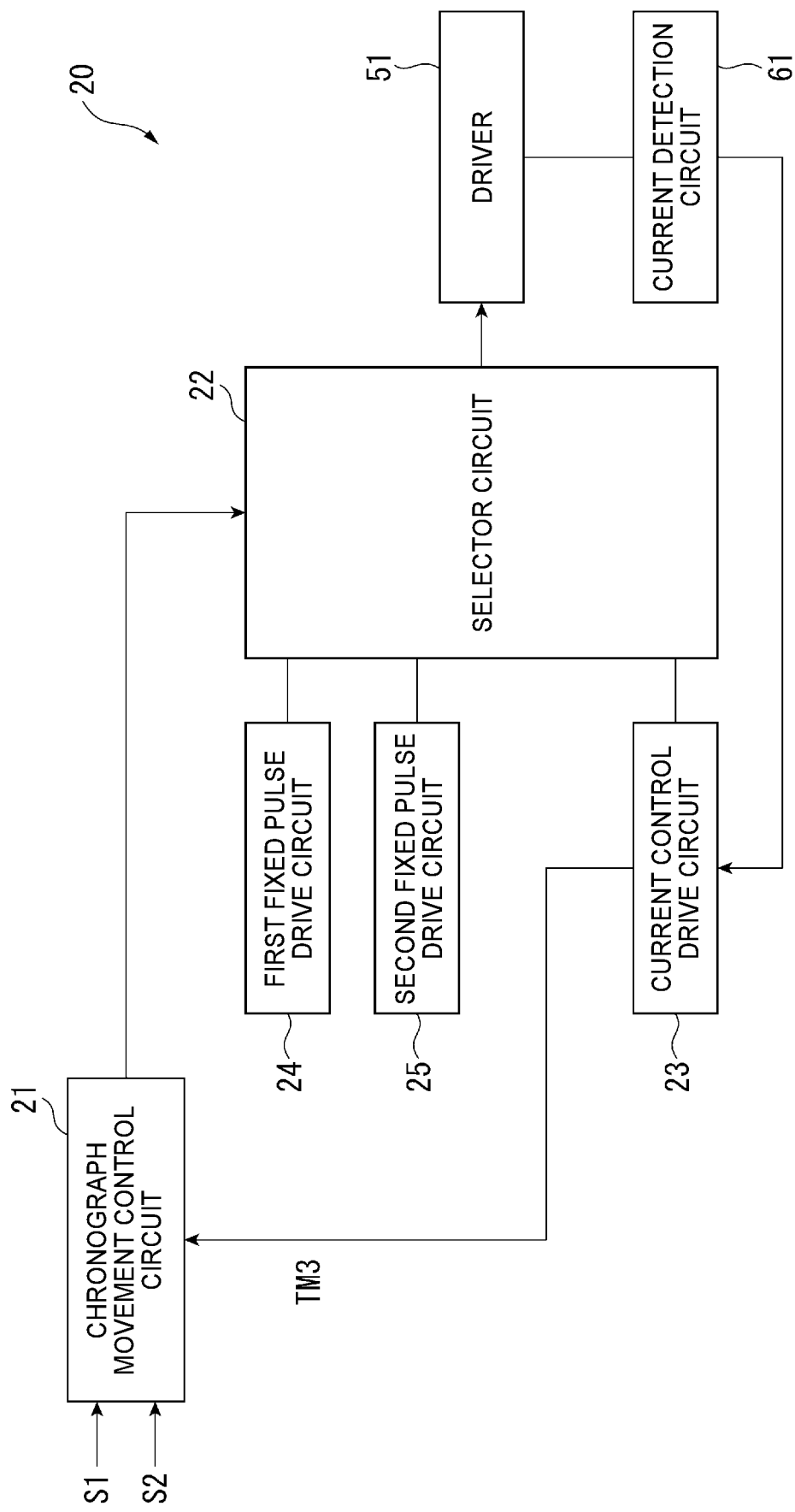
FIG. 2 is a block diagram illustrating the motor drive circuit of the first embodiment of the invention.

As shown in FIG. 2, the motor drive circuit 20 is configured by an integrated circuit (IC) or other semiconductor device, and includes a chronograph operation control circuit 21, selector circuit 22, current control drive circuit 23, first fixed pulse drive circuit 24, second fixed pulse drive circuit 25, driver 51, and current detection circuit 61.

In the motor drive circuit 20, the current control drive circuit 23 is a first drive circuit; the first fixed pulse drive circuit 24 and second fixed pulse drive circuit 25 are a second drive circuit; and the chronograph operation control circuit 21 and selector circuit 22 are a controller.

The motor drive circuit 20 operates when the chronograph mode is selected by the user pushing button A 10, which sets the operating mode of the electronic timepiece 1.

Input signals switch signal S1 and switch signal S2 are input to the chronograph operation control circuit 21. Switch signal S1 is a signal that is input when button B 11 is pushed, and switch signal S2 is signal that is input when button C 12 is pushed. The chronograph operation control circuit 21 sends a control signal for executing the operation required for the chronograph display to the selector circuit 22.

Based on the control signal input from the chronograph operation control circuit 21, the selector circuit 22 outputs a signal to the driver 51. More specifically, the selector circuit 22 outputs signals for starting, stopping, and resetting time measurement. The selector circuit 22 also reads the signals from the drive circuit selected from among the current control drive circuit 23, first fixed pulse drive circuit 24, and second fixed pulse drive circuit 25, outputs the signal to the driver 51, and controls the stepper motor based on the drive circuit selected from among the current control drive circuit 23, first fixed pulse drive circuit 24, and second fixed pulse drive circuit 25.

The current control drive circuit 23 is a circuit that controls the drive signal based on the current flow through the coil 130 of the stepper motor, and is described in detail below.

The first fixed pulse drive circuit 24 is a circuit that outputs a first fixed pulse 71 of a fixed pulse width as a second drive signal.

The second fixed pulse drive circuit 25 is a circuit that outputs a second fixed pulse 72 of a fixed pulse width as a second drive signal.

Figure 6:
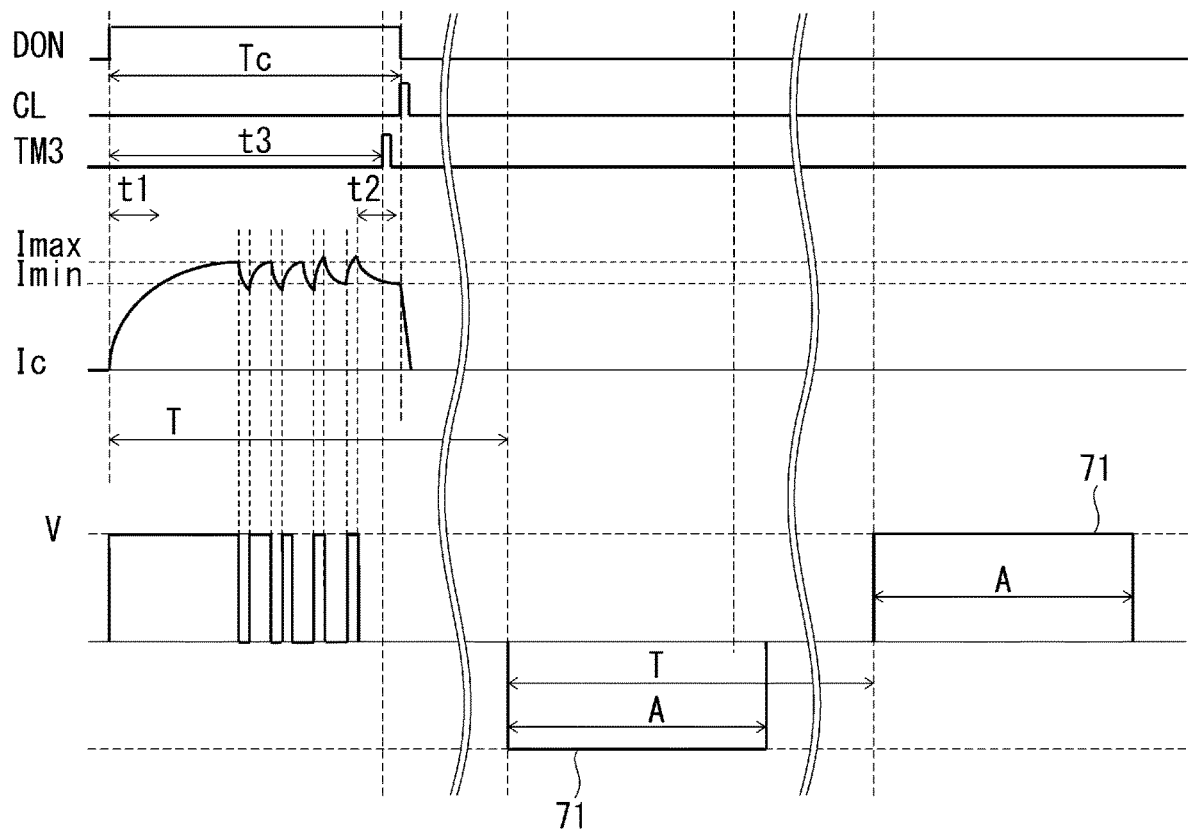
FIG. 6 is a timing chart of the operation of the motor drive control process in the first embodiment of the invention.

As shown in FIG. 6, the first fixed pulse 71 is a square wave pulse of pulse width A, and the second fixed pulse 72 is a square wave pulse of pulse width B. The pulse width A of the first fixed pulse 71 is greater than the pulse width B of the second fixed pulse 72 shown in FIG. 7, and the first fixed pulse 71 is a pulse that applies drive current to the coil 130 for a longer time than the second fixed pulse 72. In other words, the first fixed pulse 71 can apply greater torque to the stepper motor than the second fixed pulse 72.

The pulse widths A and B of the first fixed pulse 71 and second fixed pulse 72 are set based, for example, on the torque required to move the chronograph seconds hand 6 and chronograph minute hand 7.

More specifically, the pulse width B of the second fixed pulse 72 is set to a pulse width capable of driving the chronograph seconds hand 6 and chronograph minute hand 7 of the electronic timepiece 1 when operating at normal temperature.

The pulse width A of the first fixed pulse 71 is set to a pulse width capable of driving the chronograph seconds hand 6 and chronograph minute hand 7 of the electronic timepiece 1 when the load on the motor is increased, such as when the electronic timepiece 1 is used in a temperature environment below freezing (less than 0° C.), or the electronic timepiece 1 has been left unused for an extended period of time, such as five years or more. In this embodiment, the pulse width A of the first fixed pulse 71 is set to approximately 1.2 to 1.5 times the pulse width B of the second fixed pulse 72.

Configuration of the Current Control Circuit

Figure 3:
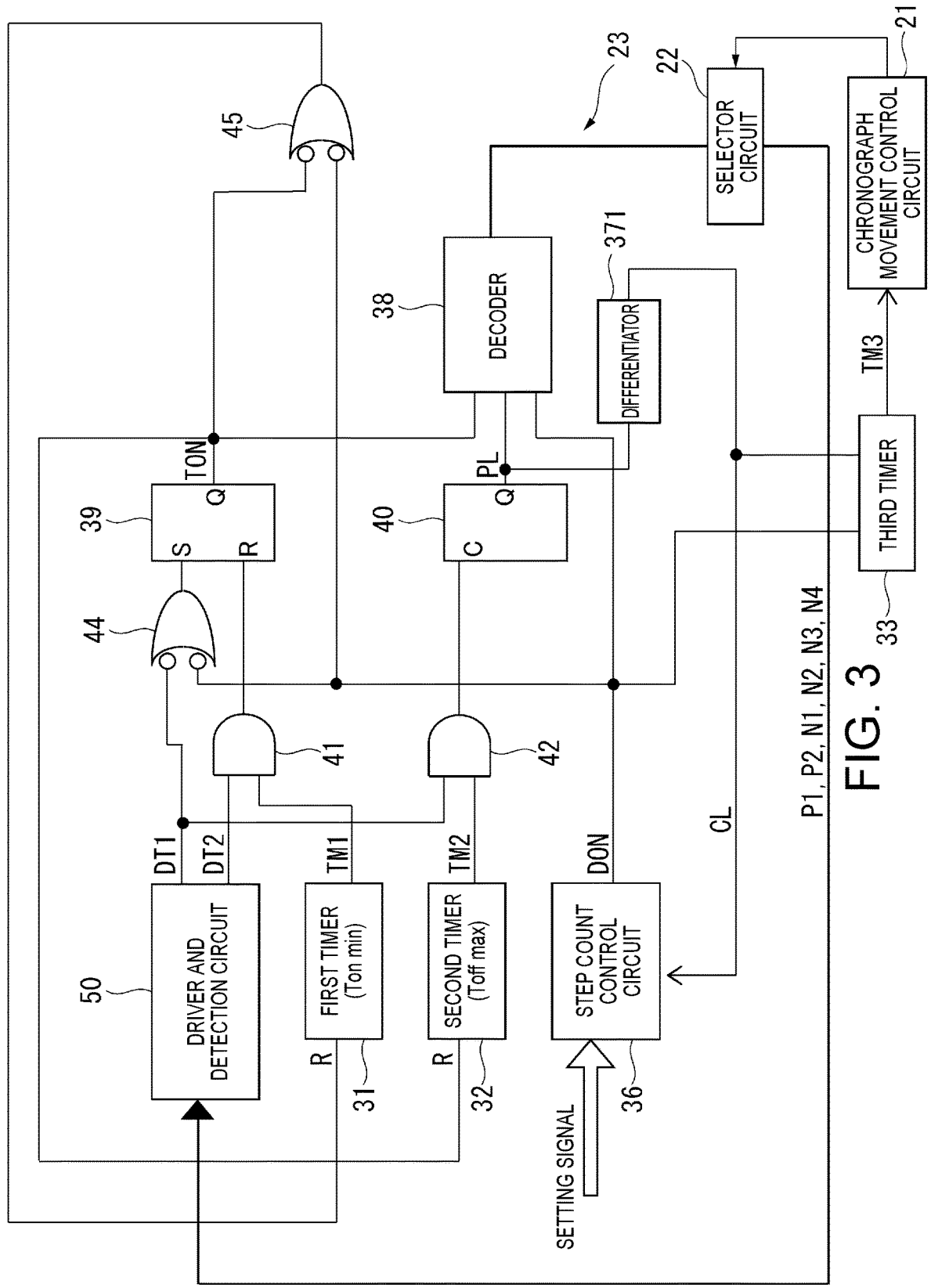
FIG. 3 is a circuit diagram of the current control drive circuit in the first embodiment of the invention.

As shown in FIG. 3, the current control drive circuit 23 comprises a first timer 31, a second timer 32, a third timer 33, a step count control circuit 36, a differentiator 371, a decoder 38, a SR latch circuit 39, a flip-flop 40, AND circuits 41 and 42, and OR circuits 44 and 45.

Figure 4:
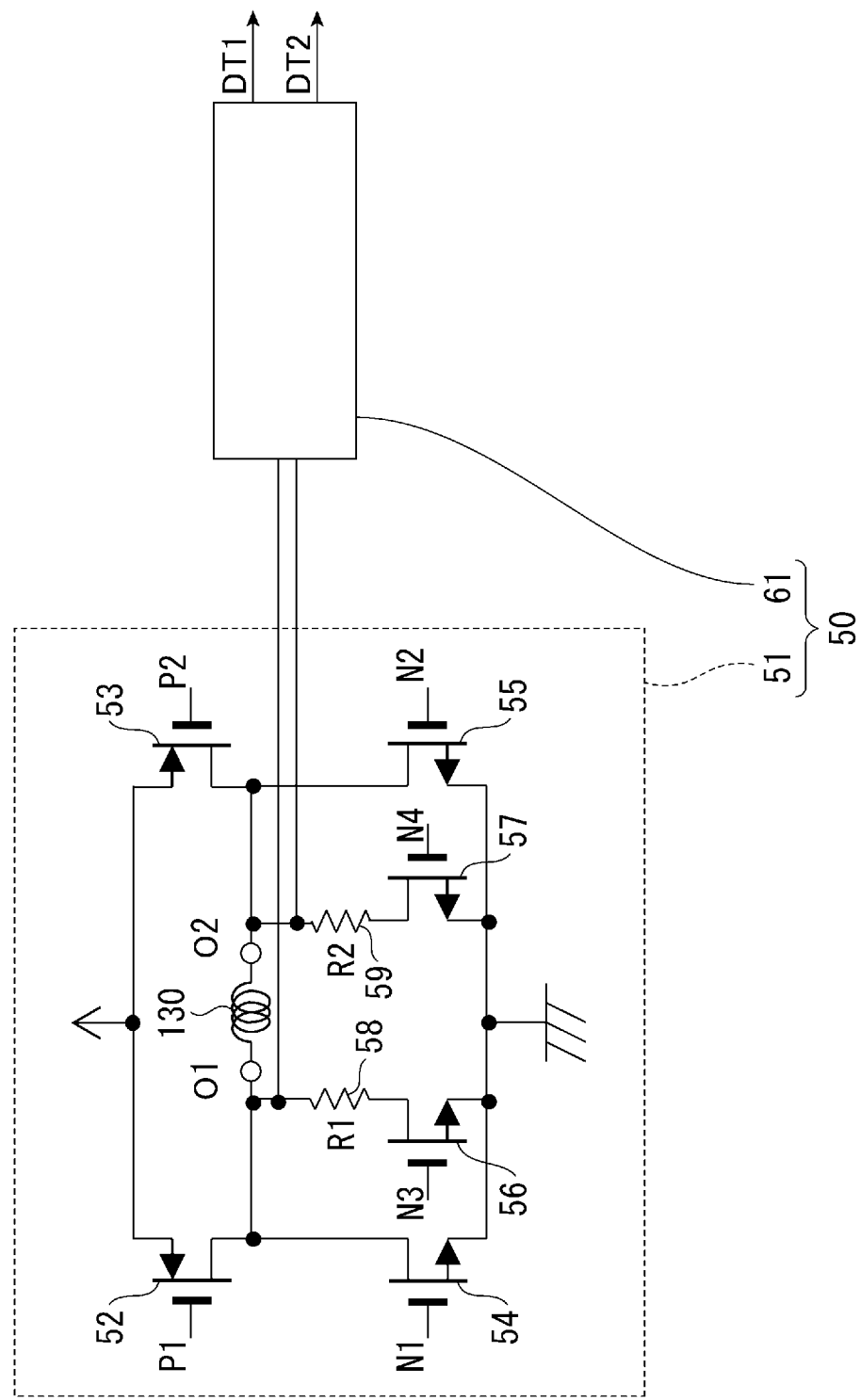
FIG. 4 is a circuit diagram of a driver in the first embodiment of the invention.

The current control drive circuit 23 outputs a first drive signal to a driver and detection circuit 50 through the selector circuit 22. As shown in FIG. 4, the driver and detection circuit 50 is a circuit that supplies current to the motor coil 130, and determines whether or not the current flow through the coil 130 is within a specific range. The driver and detection circuit 50 is described in detail below with reference to FIG. 4.

The first timer 31 is a timer that counts the time that current is supplied to the coil 130 of the motor, that is, the minimum time t1 that the driver 51 is ON. The output TM1 of the first timer 31 goes High after minimum time t1 from when the reset terminal R of the first timer 31 goes Low and the reset state is cancelled.

The second timer 32 is a timer that counts evaluation time t2, which is the condition for changing the polarity of the current flow, that is, the direction of the current flow, to the coil 130 of the motor. The output TM2 of the second timer 32 goes High after evaluation time t2 from when the reset terminal R of the second timer 32 goes Low and the reset state is cancelled.

Figure 7:
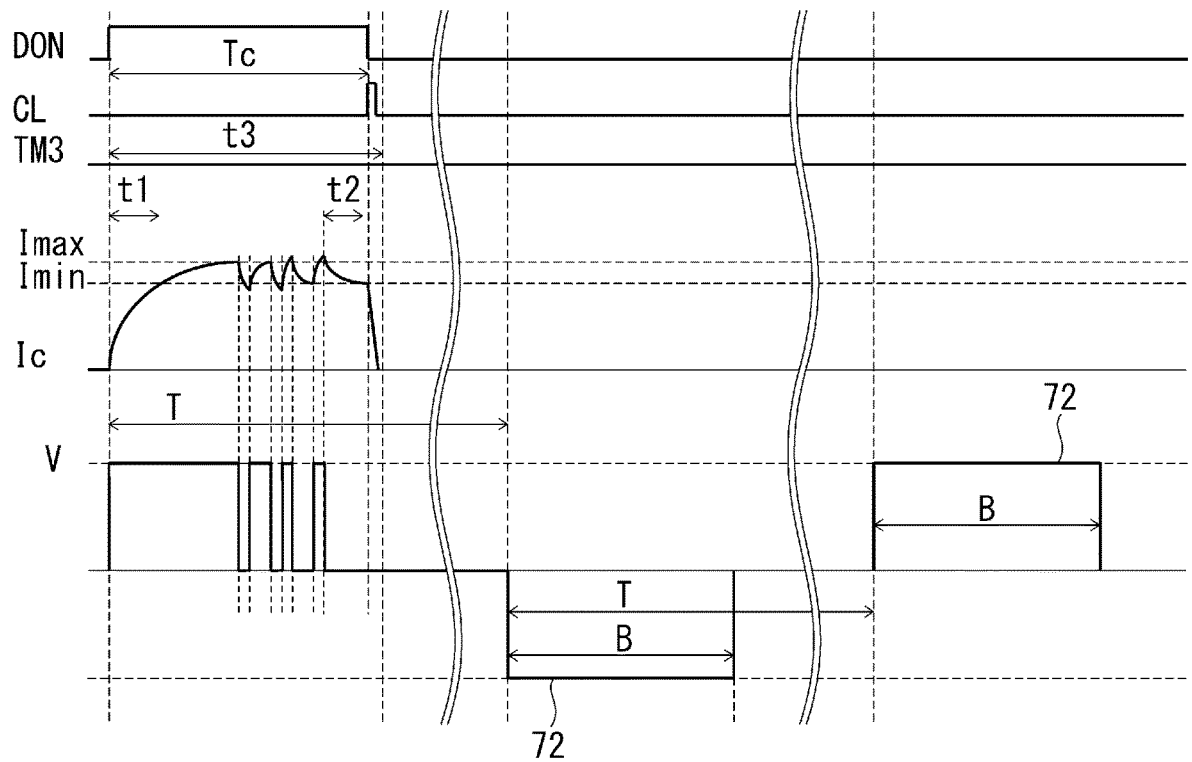
FIG. 7 is another timing chart of the operation of the motor drive control process in the first embodiment of the invention.
Figure 8:
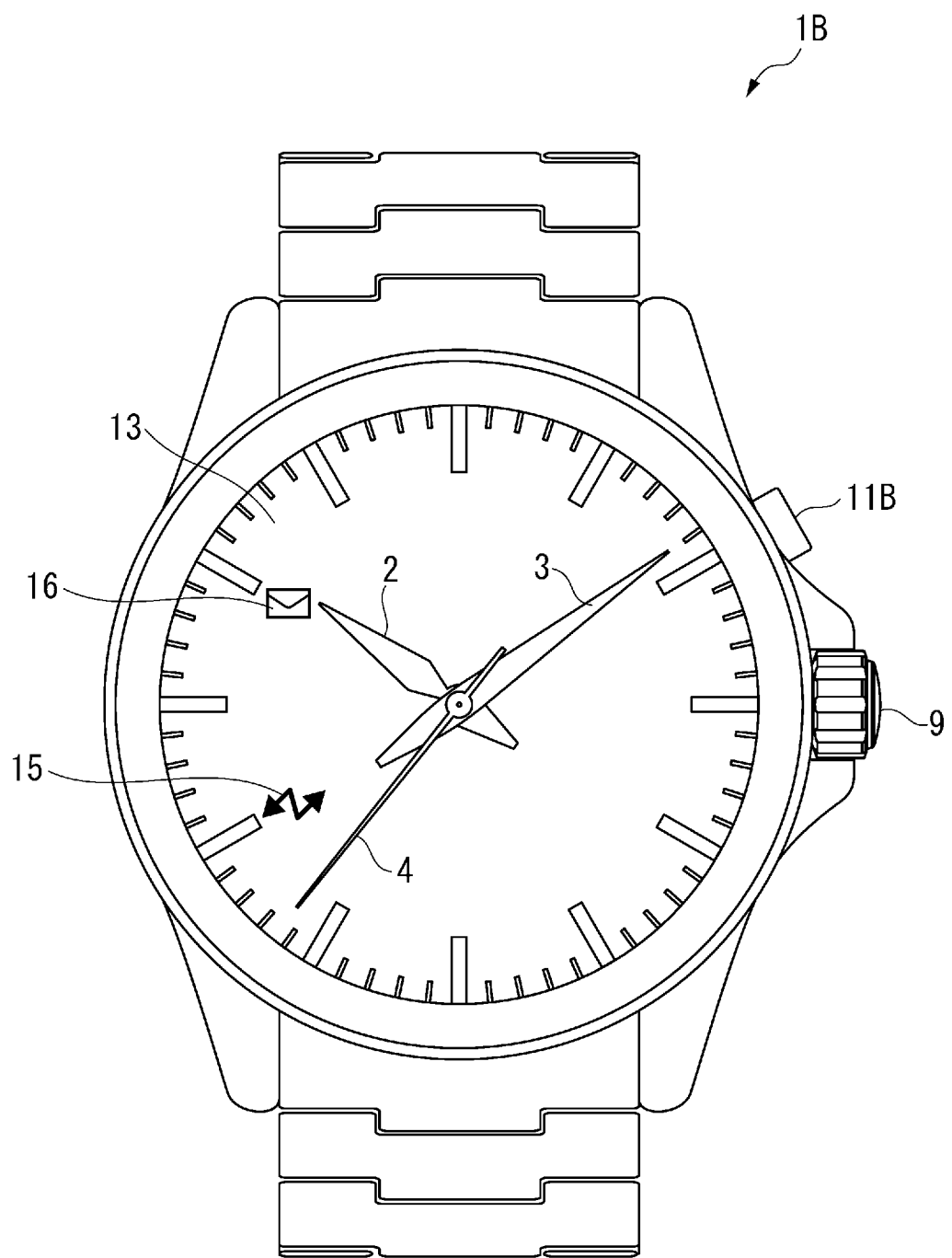
FIG. 8 is a front view of an electronic timepiece according to a second embodiment of the invention.

The third timer 33 is a timer that counts evaluation time t3, which is a threshold for evaluating the load on the motor, based on the drive time Tc to when the polarity switching condition is met after current control of the motor starts. The output TM3 of the third timer 33 goes High after evaluation time t3 from when the output DON of the step count control circuit 36 goes High and drive control of one step of the motor starts. When driving the motor one step ends and the output CL of the differentiator 371 goes High, the third timer 33 is reset. Therefore, as shown in FIG. 7, if output CL is input before evaluation time t3 passes, the output TM3 of the third timer 33 remains Low.

The output TM3 of the third timer 33 is input to the chronograph operation control circuit 21 as shown in FIG. 2 and FIG. 3. If the output TM3 of the third timer 33 remains Low, the chronograph operation control circuit 21 determines that the drive time Tc is evaluation time t3 or less, and if the output TM3 goes High, determines that the drive time Tc is longer than evaluation time t3.

The step count control circuit 36 includes a presettable down counter, and outputs drive period signal DON. The step count control circuit 36 outputs a High level drive period signal DON until the previously set value of the presettable down counter set by a setting signal is counted down at the clock signal CL to 0, and sets the drive period signal DON to a Low level signal when the presettable down counter goes to 0.

Note that the setting signal input to the step count control circuit 36 is input from the chronograph operation control circuit 21 through the selector circuit 22, for example.

A switching signal TON that switches the drive signal described below on and off, a drive polarity signal PL that changes the polarity of the drive signal, and the drive period signal DON that controls operating and stopping the driver 51, are input to the decoder 38, which outputs gate signals P1, P2, N1, N2, N3, N4 to the driver and detection circuit 50 based on the state of the input signals. The gate signals P1, P2, N1, N2, N3, N4 output from the decoder 38 are input to the driver 51 when the selector circuit 22 selects outputting the signals from the current control drive circuit 23 to the driver 51.

The differentiator 371 outputs a differential pulse at each rise and fall of the drive polarity signal PL.

The output DT2 of the driver and detection circuit 50, and the output TM1 of the first timer 31, are input to AND circuit 41. The output DT1 of the driver and detection circuit 50, and the output TM2 of the second timer 32, are input to AND circuit 42. The inverted output DT1 of the driver and detection circuit 50, and the inverted drive period signal DON output from the step count control circuit 36, are input to OR circuit 44.

The SR latch circuit 39 has a set terminal S to which output from OR circuit 44 is input, and a reset terminal R to which the output of AND circuit 41 is input. The SR latch circuit 39 outputs ON/OFF switching signal TON from output terminal Q. The ON/OFF switching signal TON from the SR latch circuit 39 is input to the decoder 38, OR circuit 45, and the reset terminal R of the second timer 32.

The output from AND circuit 42 is input to the clock terminal C of the flip-flop 40. The flip-flop 40 outputs the drive polarity signal PL from the output terminal Q.

The inverted drive period signal DON output from the step count control circuit 36, and the inverted ON/OFF switching signal TON output from the SR latch circuit 39, are input to OR circuit 45. The output of OR circuit 45 is input to the reset terminal R of the first timer 31.

Configuration of the Driver and Detection Circuit

As shown in FIG. 4, the driver and detection circuit 50 includes driver 51 and current detection circuit 61.

The driver 51 comprises two p-channel transistors 52 and 53, four n-channel transistors 54, 55, 56, and 57, and two detection resistors 58 and 59. The transistors 52 to 57 are controlled by the gate signals 1, P2, N1, N2, N3, N4 output from the decoder 38, and supply current in both forward and reverse directions to the coil 130 of the motor.

The current detection circuit 61 detects the current flow to the coil 130, and in this embodiment of the invention, by comparing the voltage at the ends of the detection resistors 58 and 59 of resistances R1 and R2 with a first reference voltage and a second reference voltage, and determines whether or not the current flow through the coil 130 is within a range between a first current level that is the minimum current level, and a second current level that is the maximum current level. The current detection circuit 61 can be configured with reference voltage generator and a comparator, for example.

The current detection circuit 61 outputs the detection result as outputs DT1 and DT2. Output DT1 is High when the current flow through the coil 130 is greater than or equal to the first current level, and is Low when less than the first current level. Output DT2 is High when the current flow through the coil 130 is greater than or equal to the second current level, and is Low when less than the second current level.

Motor Drive Control Method

The motor drive control method of the motor drive circuit 20 in this embodiment of the invention is described next with reference to the flow chart in FIG. 5 and the timing charts in FIG. 6 and FIG. 7.

Figure 5:
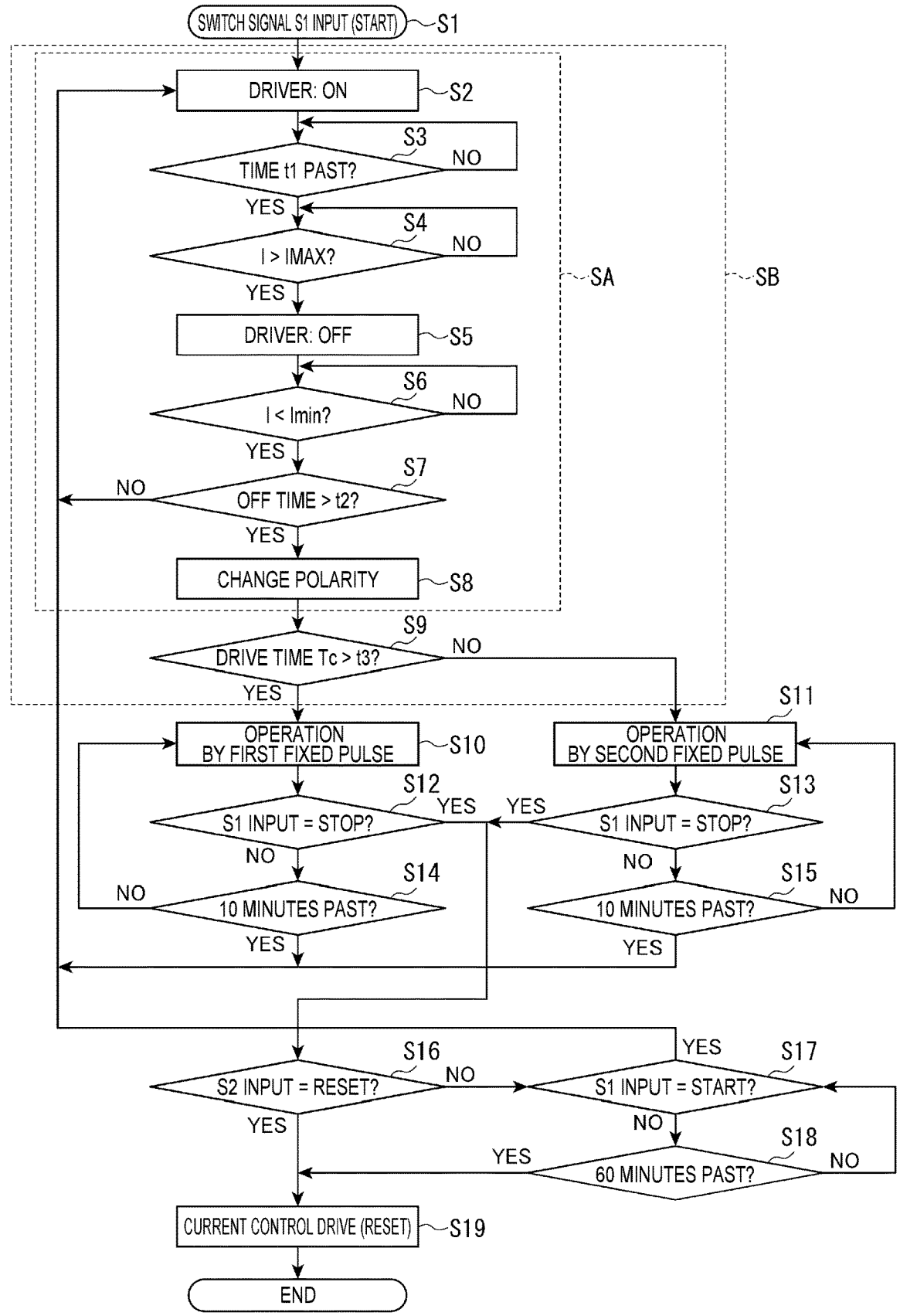
FIG. 5 is a flow chart of a motor drive control method in the first embodiment of the invention.

The chronograph operation control circuit 21 of the motor drive circuit 20 executes step S1 in FIG. 5 and starts drive control of the chronograph motor if the chronograph mode is set and switch signal S1 is input by pushing button B 11.

The chronograph operation control circuit 21 then first instructs the selector circuit 22 to start operation of the chronograph seconds hand 6 and chronograph minute hand 7 using the current control drive circuit 23. As a result, the selector circuit 22, immediately after starting operation control of the chronograph, controls executing motor drive control using the current control drive circuit 23 so that the drive signal from the current control drive circuit 23 is input to the driver 51. In this event, because motor drive control using the current control drive circuit 23 advances the motor only one step, the selector circuit 22 outputs a setting signal to the step count control circuit 36 that sets the number of steps, and sets the number of steps to one.

After the selector circuit 22 outputs the setting signal and sets the step count n of the step count control circuit 36, control by the following steps S2 to S8 are executed by circuits in the current control drive circuit 23.

When the setting signal sets the step count n to n=1 in the step count control circuit 36, the drive period signal DON output by the step count control circuit 36 goes High, and the decoder 38 outputs gate signals P1, P2, N1, N2, N3, N4. As a result, step S2 setting the driver 51 ON executes, and current flows in the positive direction to coil 130.

Note that in this flow chart and the description below, the driver 51 turning ON means controlling the driver 51 to an ON state enabling supplying drive current to the coil 130, and the driver 51 turning OFF means controlling the driver 51 to an OFF state unable to supply drive current to the coil 130.

In this embodiment, immediately after the drive period signal DON goes High in the timing chart in FIG. 6, the decoder 38 sets P1 Low, P2 High, and sets the p-channel transistor 52 ON and p-channel transistor 53 OFF. The decoder 38 also sets N1 to N3 Low, sets N4 High, n-channel transistors 54, 55, 56 OFF, and n-channel transistor 57 ON. As a result, current flows through p-channel transistor 52, terminal O1, coil 130, terminal O2, detection resistance 59, and n-channel transistor 57. In this embodiment, the current flowing from terminal O1 toward terminal O2 through the coil 130 is referred to as forward current.

Also in this embodiment, the drive current supplied to the coil 130 switches between a first polarity and second polarity, current flows in the forward direction to the coil 130 in the first polarity, and current flows in the reverse direction to the coil 130 in the second polarity. Therefore, the state in which current flows in the forward direction through the coil 130 is the state in which the driver 51 is controlled to the ON state to supply drive current of the first polarity, and the state in which current flows in the reverse direction through the coil 130 is the state in which the driver 51 is controlled to the ON state to supply drive current of the second polarity.

The current control drive circuit 23 then executes step S3, and based on the level of output TM1 from the first timer 31, determines whether or not the specified time t1 has past after the first timer 31 operates. As described below, because the first timer 31 starts operating when the driver 51 turns ON, the first timer 31 determines in step S3 whether or not specified time t1 has past since the driver 51 turned ON. If step S3 returns NO, the current control drive circuit 23 repeats the operation of step S3.

If the current control drive circuit 23 determines YES in step S3, it executes step S4 and determines by the current detection circuit 61 whether or not the current I flow through the coil 130 exceeded maximum current Imax. Until current I exceeds maximum current Imax, the current control drive circuit 23 returns NO in step S4 and then repeats step S4. More specifically, when the ON/OFF switching signal TON output from the SR latch circuit 39 changes to High, the output of the OR circuit 45 changes from High to Low, and the reset state of the first timer 31 is cancelled.

As a result, the first timer 31 starts counting time t1, outputs a Low level signal until time t1 passes, and after time t1 passes, that is, when step S3 returns YES, outputs a High level signal. The output of AND circuit 41 changes to High when both output TM1 and the output DT2 of the current detection circuit 61 are High.

When the output of the AND circuit 41 goes High, the SR latch circuit 39 is reset, and output TON changes to Low. As a result, the decoder 38 executes step S5 to turn the driver 51 OFF by means of gate signals P1, P2, N1, N2, N3, N4.

More specifically, P1 goes High, P2 goes High, N1 goes High, N2 goes Low, N3 goes High, and N4 goes High. As a result, both ends of the coil 130 connect to power supply terminal VSS and short, and the supply of current I from the driver 51 to the coil 130 stops. Therefore, the state in which current does not flow to the coil 130 is a state in which the driver 51 is controlled to the OFF state. In this embodiment of the invention, when p-channel transistors 52, 53 and n-channel transistor 55 are OFF, and n-channel transistors 54, 56, 57 are ON, the driver 51 is in the OFF state of the first polarity.

If output TON then changes to Low, the reset of the second timer 32 is cancelled and the second timer 32 starts counting the time. If driver 51 is turned ON and output TON goes High, the second timer 32 is reset and counting time t2 stops.

Next, the current control drive circuit 23 executes step S6 to determine whether or not the current I flow through the coil 130 has dropped below the minimum current Imin.

If the current control drive circuit 23 returns YES in step S6, the current control drive circuit 23 executes step S7 to determine whether or not the OFF time of the driver 51 exceeds evaluation time t2. More specifically, the current control drive circuit 23 returns NO in step S7 if the time past from when the driver 51 turned OFF until current I goes below minimum current Imin (the OFF time) is less than or equal to time t2, and returns YES in step S7 if the OFF time exceeds time t2. More specifically, if current I is below minimum current Imin and output TM2 is High when step S6 returns YES, the current control drive circuit 23 determines the driver 51 OFF time exceeds evaluation time t2, but if output TM2 is Low, determines evaluation time t2 is not exceeded.

If the current control drive circuit 23 returns NO in step S7, the stepper motor has not been driven one step, polarity is therefore not switched, control returns to step S2, and the driver 51 turns ON and drives the motor.

More specifically, when output TON of second timer 32 is Low, the reset is cancelled and the second timer 32 starts counting evaluation time t2, and when evaluation time t2 has past, the output TM2 of the second timer 32 goes High.

If current I is below the minimum current Imin, detection signal DT1 changes to Low. If at this time the OFF time counted by the second timer 32 is less than time t2, the output TM2 of the second timer 32 remains Low. As a result, even if the level of the detection signal DT1 changes, the output of AND circuit 42 remains Low, and the drive polarity signal PL output from the flip-flop 40 remains the same level. Therefore, the driver 51 turns ON by the detection signal DT1 changing to Low and the output TON of the SR latch circuit 39 changing to High without switching the polarity.

If the driver 51 OFF time exceeds the evaluation time t2 and step S7 returns YES, step S8 executes, the flip-flop 40 changes the signal level of the drive polarity signal PL, and the polarity changes. The current control drive process SA of the current control drive circuit 23 is executed by steps S2 to S8 described above.

The output TM2 of the second timer 32 remains Low until evaluation time t2 passes from when the driver 51 turns OFF, and output TM2 turns High when evaluation time t2 has past. In addition, detection signal DT1 is High when the driver 51 turns OFF, and turns Low when the current I drops and goes below the minimum current Imin. The output of the AND circuit 42 is therefore held Low while output TM2 is Low, and changes to High when output TM2 changes to High. In addition, when current I is below minimum current Imin and detection signal DT1 changes to Low, the output of the AND circuit 42 changes from High to Low. When the clock signal at the falling edge when the AND circuit 42 output changes from High to Low is input to the flip-flop 40, the state of the drive polarity signal PL inverts, and the decoder 38 controls the driver 51 to change the polarity of the drive signal. Because there is a correlation between the OFF time of the driver 51 and the angle of rotation of the rotor, evaluation time t2 is set based on the value produced when the rotor turns approximately 180 degrees.

When the state of the drive polarity signal PL inverts and the polarity changes, a signal is output from the differentiator 371 to which the drive polarity signal PL is input, this signal is input as the clock signal CL of the step count control circuit 36, the remaining step count is reduced by 1, the step count goes to 0, and drive control of the motor by the current control drive circuit 23 ends.

The clock signal CL is input to the third timer 33, and the third timer 33 is reset when the clock signal CL is input. If the previously set evaluation time t3 passes after the third timer 33 starts counting and before it is reset, the third timer 33 outputs a High level signal as the output TM3. If the third timer 33 is reset before evaluation time t3 passes, the output TM3 of the third timer 33 does not output Low.

As a result, the chronograph operation control circuit 21 executes step S9 determining based on the output TM3 from the third timer 33 whether the drive time Tc of the motor by the current control drive circuit 23 is longer or shorter than evaluation time t3. If step S9 returns YES, the chronograph operation control circuit 21 determines the load on the motor is high. If step S9 returns NO, the chronograph operation control circuit 21 determines the load on the motor is low.

In other words, the result of driving by the current control drive circuit 23, which is a first drive circuit, is expressed by the result of comparing the drive time Tc with evaluation time t3. If the drive time Tc is longer than evaluation time t3, the chronograph operation control circuit 21 determines the result of driving satisfies a first condition, and if the drive time Tc is less than or equal to the evaluation time t3, the chronograph operation control circuit 21 determines the result of driving satisfies a second condition.

As a result, a state evaluation process SB that evaluates the load on the motor is executed by the current control drive process of steps S2 to S8 of the current control drive circuit 23, and the process of comparing the drive time Tc with the evaluation time t3 in step S9.

Based on the result from step S9, the chronograph operation control circuit 21 outputs a signal to the selector circuit 22, and the selector circuit 22 selects the drive signal output to the driver 51 from either the first fixed pulse 71 output from the first fixed pulse drive circuit 24, or the second fixed pulse 72 output from the second fixed pulse drive circuit 25.

In this embodiment of the invention the first fixed pulse 71 has a greater pulse width than the second fixed pulse 72.

When the drive time Tc of the motor by the current control drive circuit 23 exceeds evaluation time t3, and YES is returned in step S9 because the load on the motor is heavy, the selector circuit 22 executes step S10.

In step S10, the selector circuit 22 controls the gate signals P1, P2, N1, N2, N3, N4 input to the driver 51 based on the first fixed pulse 71 output from the first fixed pulse drive circuit 24. More specifically, as shown in FIG. 6, the selector circuit 22 controls the driver 51 so that current flows from terminal O2 to terminal O1 during pulse width A of the first fixed pulse 71 when the second polarity is selected, and when the first polarity is selected, controls the driver 51 so current flows from terminal O1 to terminal O2. When driving the chronograph seconds hand 6, for example, the first fixed pulse 71 is input every period T (=1 second) to drive the chronograph seconds hand 6.

However, if the drive time Tc of the motor by the current control drive circuit 23 is less than the evaluation time t3, and NO is returned in step S9 because the load on the motor is low, the selector circuit 22 executes step S11.

In step S11, the selector circuit 22 controls the gate signals P1, P2, N1, N2, N3, N4 input to the driver 51 based on the second fixed pulse 72 output from the second fixed pulse drive circuit 25. As shown in FIG. 7, the selector circuit 22 controls the driver 51 so that current flows from terminal O2 to terminal O1 during the pulse width B of the second fixed pulse 72 when the second polarity is selected, and flows from terminal O1 to terminal O2 when the first polarity is selected.

During operation by the first fixed pulse 71 in step S10, and during operation by the second fixed pulse 72 in step S11, the chronograph operation control circuit 21 executes steps S12 and S13, respectively, to determine whether or not button B 11 that stops operation was pushed and switch signal S1 was input.

When step S12 or S13 returns NO, the chronograph operation control circuit 21 respectively executes step S14 or S15 to determine whether or not 10 minutes have past since operation by first fixed pulse 71 or second fixed pulse 72 started. If 10 minutes have not past since operation by first fixed pulse 71 or second fixed pulse 72 started, and step S14 or S15 returns NO, the chronograph operation control circuit 21 continues the operation processes of step S10 or S11.

However, if step S14 or S15 returns YES, the chronograph operation control circuit 21 returns to the process of step S2, and repeats the current control drive process SA. As a result, after the chronograph operation control circuit 21 starts counting time, it drives the motor by the current control drive circuit 23 to advance one step every ten minutes, and continues driving the motor by either the first fixed pulse 71 or the second fixed pulse 72 that was selected according to the drive time Tc in that iteration.

If the button B 11 is pushed and the switch signal S1 is input while the chronograph continues counting time, the chronograph operation control circuit 21 returns YES in step S12 and S13, and executes step S16 to determine whether or not switch signal S2 was input by pushing button C 12, that is, whether a command to reset the chronograph was input.

If step S16 returns NO, the chronograph operation control circuit 21 executes step S17 and determines whether or not switch signal S1 was input by button B 11, that is, whether or not a command to resume counting time was input. If the chronograph operation control circuit 21 returns YES in step S17, the chronograph operation control circuit 21 returns to step S2 and continues the time counting process.

However, if step S17 returns NO, the chronograph operation control circuit 21 executes step S18 to determine whether or not 60 minutes have past since time measurement was stopped by switch signal S1. While step S18 returns NO, the chronograph operation control circuit 21 continues determining whether or not switch signal S1 was input in step S17.

When a reset signal is input by switch signal S2 and step S16 returns YES, and when 60 minutes have past since time counting was stopped by switch signal S1 and step S18 returns YES, the chronograph operation control circuit 21 executes the current control drive process S19 to reset the chronograph seconds hand 6 and chronograph minute hand 7 to the 0 positions, and stops chronograph operation.

Effect of Embodiment 1

When controlling chronograph operation, the motor drive circuit 20 in this embodiment of the invention first drives the movement by the current control drive circuit 23, compares the result of driving in this current control drive process, or more specifically the drive time Tc, with an evaluation time t3, and evaluates the size of the load on the stepper motor. The motor drive circuit 20 can therefore appropriately select the fixed pulse to use for driving the motor.

As a result, a pulse capable of reliably driving the motor can be selected even when the load on the motor changes due to the length, thickness, or weight of the hands used as the chronograph seconds hand 6 and chronograph minute hand 7 of the electronic timepiece 1, or when the load changes because of a change in the temperature of the environment in which the electronic timepiece 1 is used or because the electronic timepiece 1 is left unused for an extended time.

Furthermore, because this embodiment of the invention drives by the current control drive circuit 23 at a specific time interval, which is ten minutes in this example, and otherwise drives with the first fixed pulse drive circuit 24 and second fixed pulse drive circuit 25, the motor can be reliably driven even when the load on the motor changes while the chronograph is operating by switching between the first fixed pulse 71 and second fixed pulse 72.

Drive control by the current control drive circuit 23 can move the hands rapidly by driving the motor at high speed, but cannot easily drive by a fixed drive frequency such as 1 Hz. However, drive control by the first fixed pulse drive circuit 24 and second fixed pulse drive circuit 25 simplify control when driving by a fixed drive frequency. Because this embodiment drives only one step by the current control drive circuit 23 in a 10 minute period, and otherwise drives by the first fixed pulse drive circuit 24 and second fixed pulse drive circuit 25, chronograph operation requiring driving the motor at a fixed period such as every one second can be easily controlled.

Because the current control drive circuit 23 is used to reset the chronograph seconds hand 6 and chronograph minute hand 7 to the 0 positions, the hands can be rapidly advanced and reset to 0 in a short time.

Embodiment 2

A second embodiment of the invention is described next with reference to FIG. 8 to FIG. 13. Note that like parts in this second embodiment and the first embodiment described above are identified by like reference numerals and further description thereof is omitted.

Configuration

An electronic timepiece 1B according to the second embodiment of the invention is a smart watch capable of displaying the time and other types of information. As a result, in addition to an hour hand 2, a minute hand 3, a second hand 4, a crown 9, and a button B 11B, the electronic timepiece 1B has an activity monitor and indicator, a tethering indicator identifying a communication link to a smartphone or other external device, e-mail and SNS (Social Networking Service) notification indicators, a time zone selector for selecting the time zone of the time indicated by the hour hand 2 and minute hand 3, and other display functions. The electronic timepiece 1B shown in FIG. 8 has a marker 15 at the 8:00 position on the dial 13 that the second hand 4 points to when linking to an external device, and at the 10:00 position on the dial 13 has a marker 16 that the second hand 4 points to when a notification is received.

The electronic timepiece 1B has three motors for separately driving the hour hand 2, minute hand 3, and second hand 4. The motors are driven by the motor drive circuit 20B shown in FIG. 9, and the motors are controlled to move the hands rapidly or normally according to the function.

Figure 9:
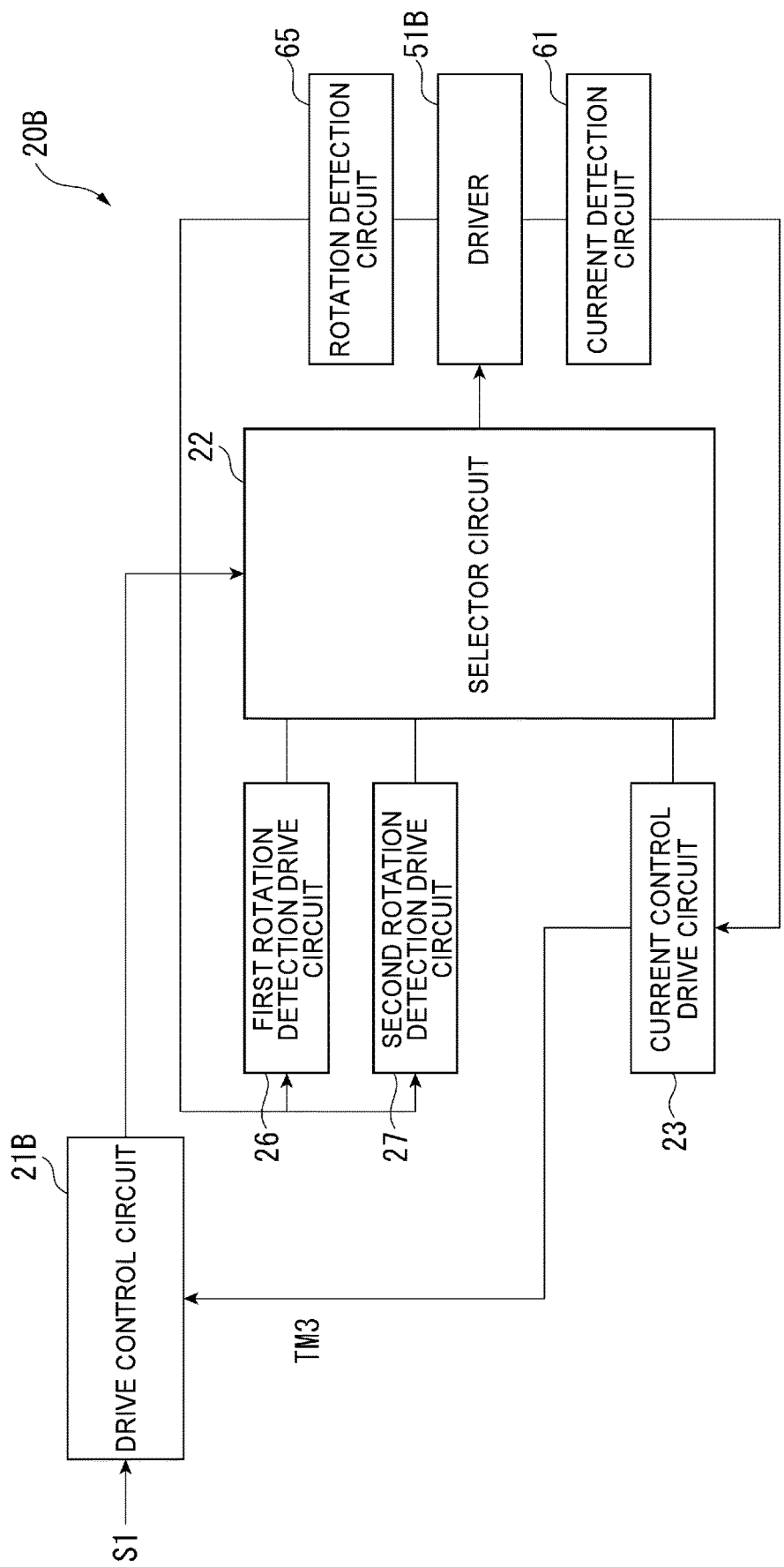
FIG. 9 is a block diagram illustrating the motor drive circuit of the second embodiment of the invention.

The configuration of the motor drive circuit 20B in this electronic timepiece 1B is described next with reference to FIG. 9. Note that like parts in this motor drive circuit 20B and the motor drive circuit 20 of the first embodiment are identified by like reference numerals and further description thereof is omitted. The motor drive circuit 20B includes a drive control circuit 21B, selector circuit 22, current control drive circuit 23, driver 51B, first rotation detection drive circuit 26, second rotation detection drive circuit 27, current detection circuit 61, and rotation detection circuit 65.

In the motor drive circuit 20B according to the second embodiment of the invention, the current control drive circuit 23 is a first drive circuit, the first rotation detection drive circuit 26 and second rotation detection drive circuit 27 configure a second drive circuit, and the drive control circuit 21B and selector circuit 22 configure a controller.

The drive control circuit 21B drives each of the motors that drive the hour hand 2, minute hand 3, and second hand 4 at the operation cycle appropriate to each hand during the normal timekeeping operation. When button B 11B is pushed and the mode selection switch signal S1 is input, or when an event such as receiving a notification from a tethered smartphone occurs and the switch signal S1 is input, the drive control circuit 21B controls the selector circuit 22 to move a specific hand, such as moving the second hand 4 to a specific position, by means of the current control drive circuit 23. In this example, whether mail has been received, when changing the time zone, and communication with an external device, are indicated by the second hand 4.

After outputting a motor drive pulse, which is a second drive signal, to the driver 51B, the first rotation detection drive circuit 26 and second rotation detection drive circuit 27 output a detection pulse, detect the induced EMF caused by the detection pulse output after a specific mask time is detected by the rotation detection circuit 65, and whether or not the rotor turned is detected by the number of detection pulses whereby the induced EMF exceeded a specific threshold V. When the rotor is not turning, the first rotation detection drive circuit 26 and second rotation detection drive circuit 27 output a compensating drive pulse that can reliably turn the rotor.

Figure 12:
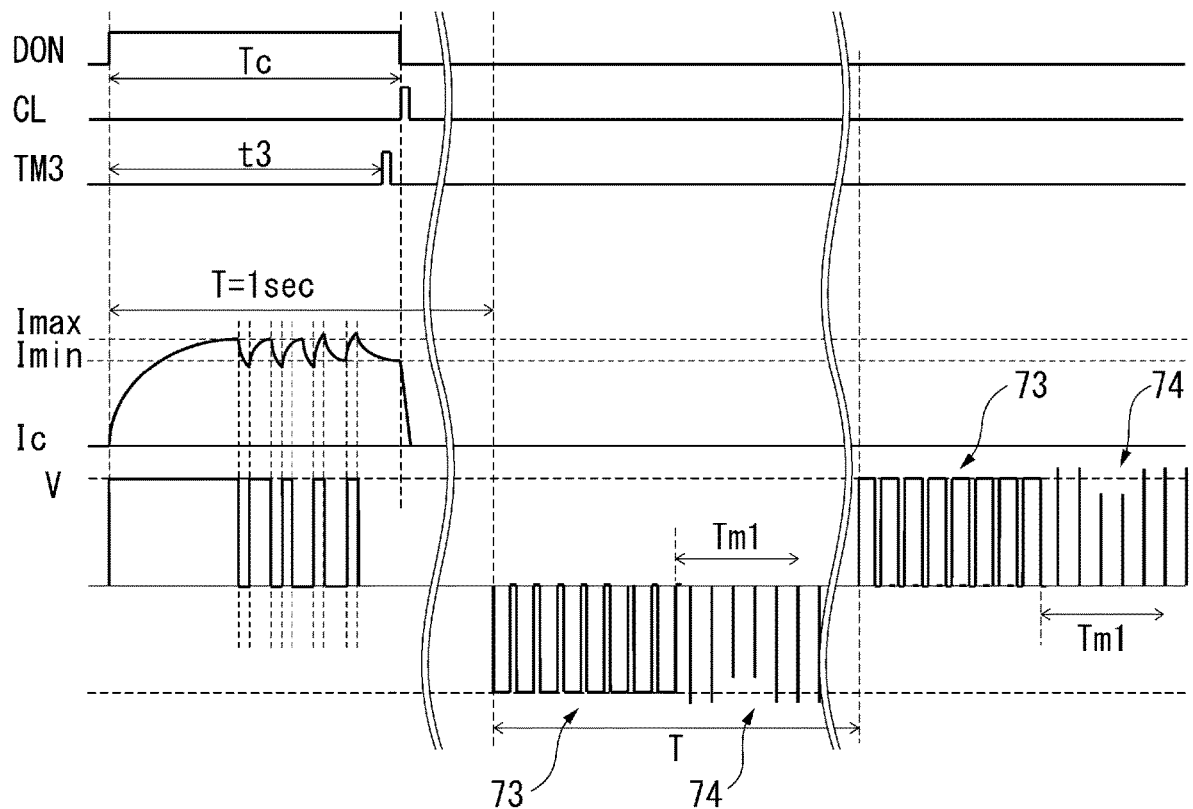
FIG. 12 is a timing chart of the operation of the motor drive control process in the second embodiment of the invention.

If a drive result indicating the drive time Tc by the current control drive circuit 23, which is a first drive circuit, is longer than the evaluation time t3 is acquired, and the first condition is met, that is, the load on the motor is high, the first rotation detection drive circuit 26 outputs a first drive pulse 73 as the second drive signal as shown in FIG. 12. The first rotation detection drive circuit 26 also outputs a first detection pulse 74 after outputting the first drive pulse 73.

However, detection based on the first detection pulse 74 immediately after outputting the first drive pulse 73 may result in falsely detecting that the rotor is turning even when the rotor is not turning. Therefore, a first detection mask time Tm1 after the first drive pulse 73 is output is set, and the rotation detection circuit 65 evaluates rotation detection based on the first detection pulse 74 after this first detection mask time Tm1 passes.

Figure 13:
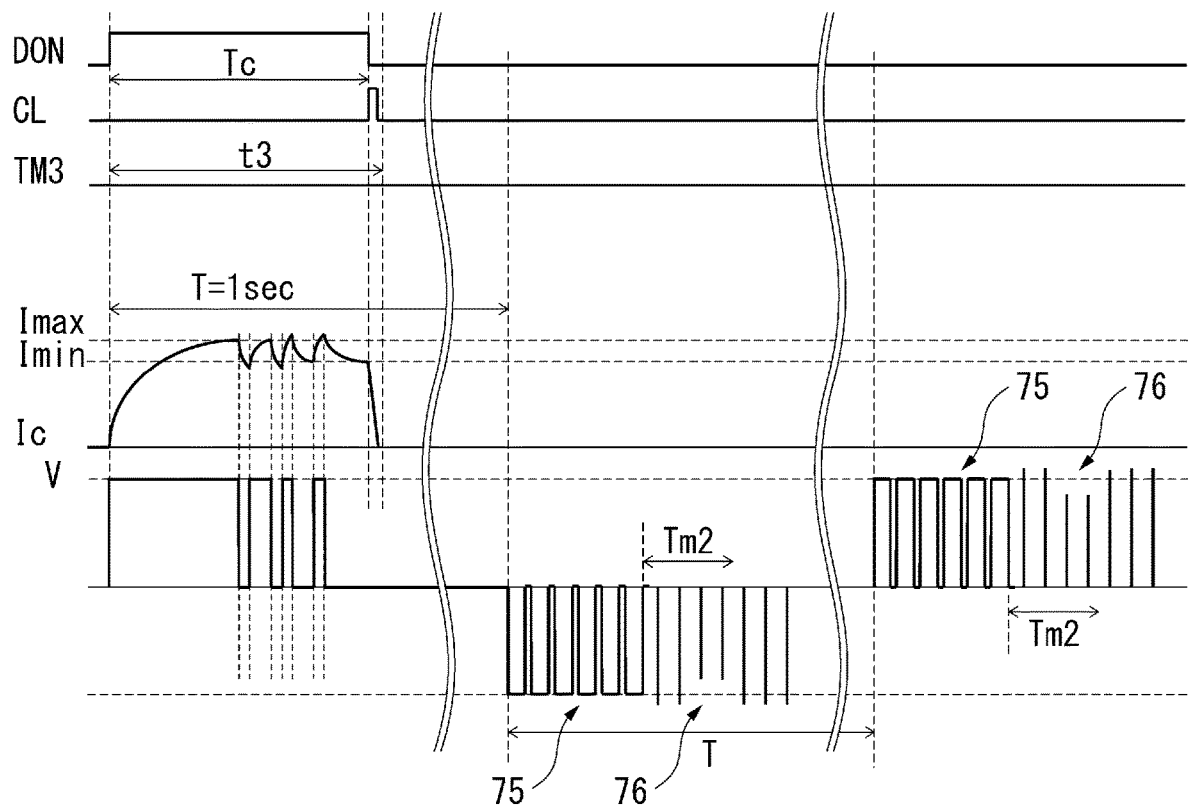
FIG. 13 is another timing chart of the operation of the motor drive control process in the second embodiment of the invention.
Figure 14:
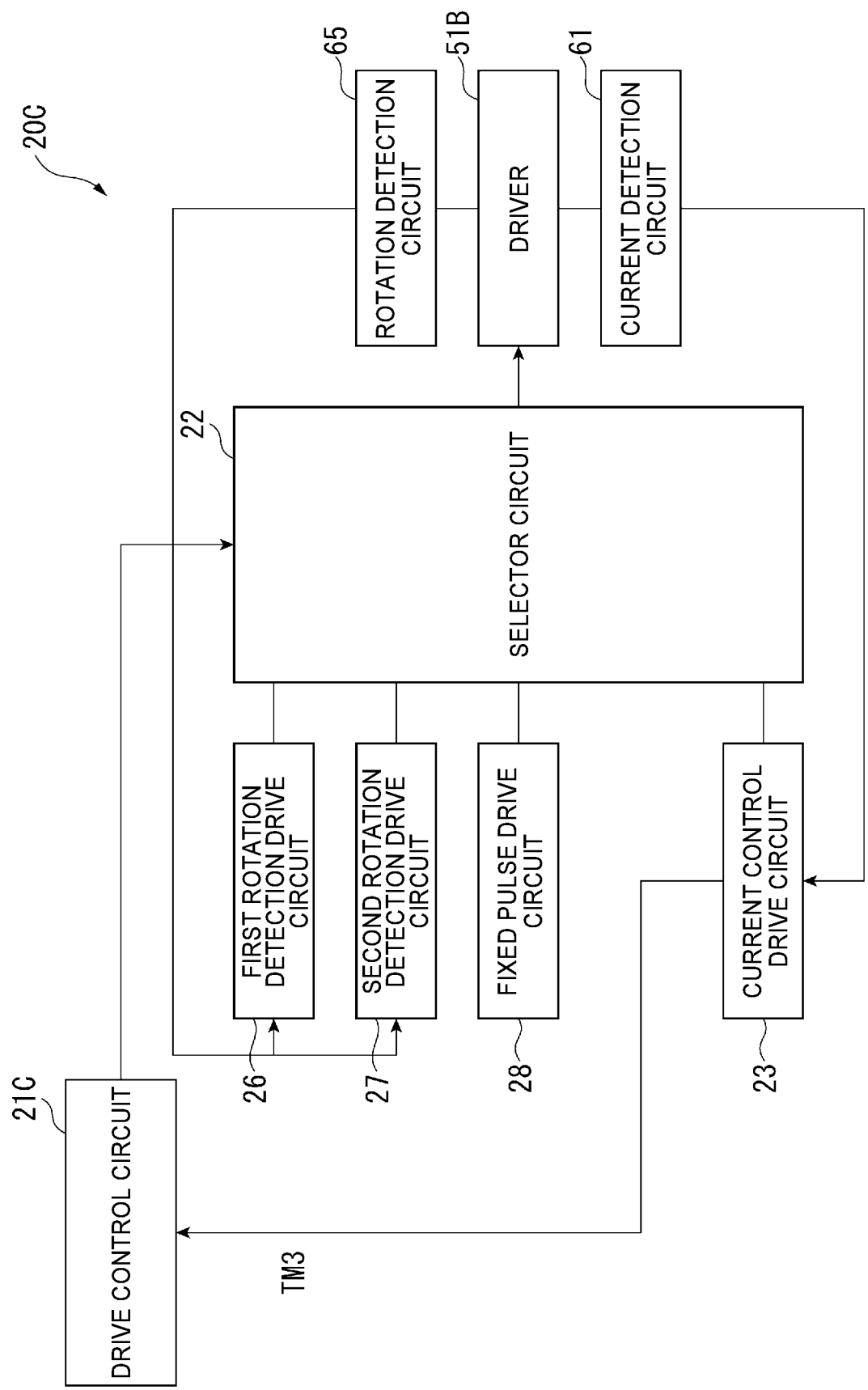
FIG. 14 is a block diagram illustrating the motor drive circuit of the third embodiment of the invention.

If the drive time Tc is less than or equal to the evaluation time t3 and the second condition is met as the drive result by the first drive circuit, that is, the load on the motor is low, the second rotation detection drive circuit 27 outputs a second drive pulse 75 as the second drive signal as shown in FIG. 13. The second rotation detection drive circuit 27 then outputs a second detection pulses 76 after outputting the second drive pulse 75, and the rotation detection circuit 65 evaluates rotation detection based on the second detection pulses 76 after a second detection mask time Tm2 passes.

Note that the first drive pulse 73 and second drive pulse 75 are both comb-shaped chopping pulses, the first drive pulse 73 having more chopping pulses than the second drive pulse 75. For example, in the examples shown in FIG. 12 and FIG. 13, the first drive pulse 73 has eight chopping pulses, and the second drive pulse 75 has six chopping pulses.

Note that the first drive pulse 73 and second drive pulse 75 are not limited to these number of chopping pulses, and the duty may differ. Essentially, the first drive pulse 73 produces greater torque in the stepper motor than the second drive pulse 75, that is, enables driving the motor even when the load on the motor is high.

In this embodiment, as described above, first detection mask time Tm1 or second detection mask time Tm2 is selectively set as the rotation detection condition of the rotation detection circuit 65 based on comparing the drive result of the first drive circuit, that is, drive time Tc, with the evaluation time t3. The first detection mask time Tm1, which is selected when the motor load is high, is set to a longer time than the second detection mask time Tm2.

Figure 10:
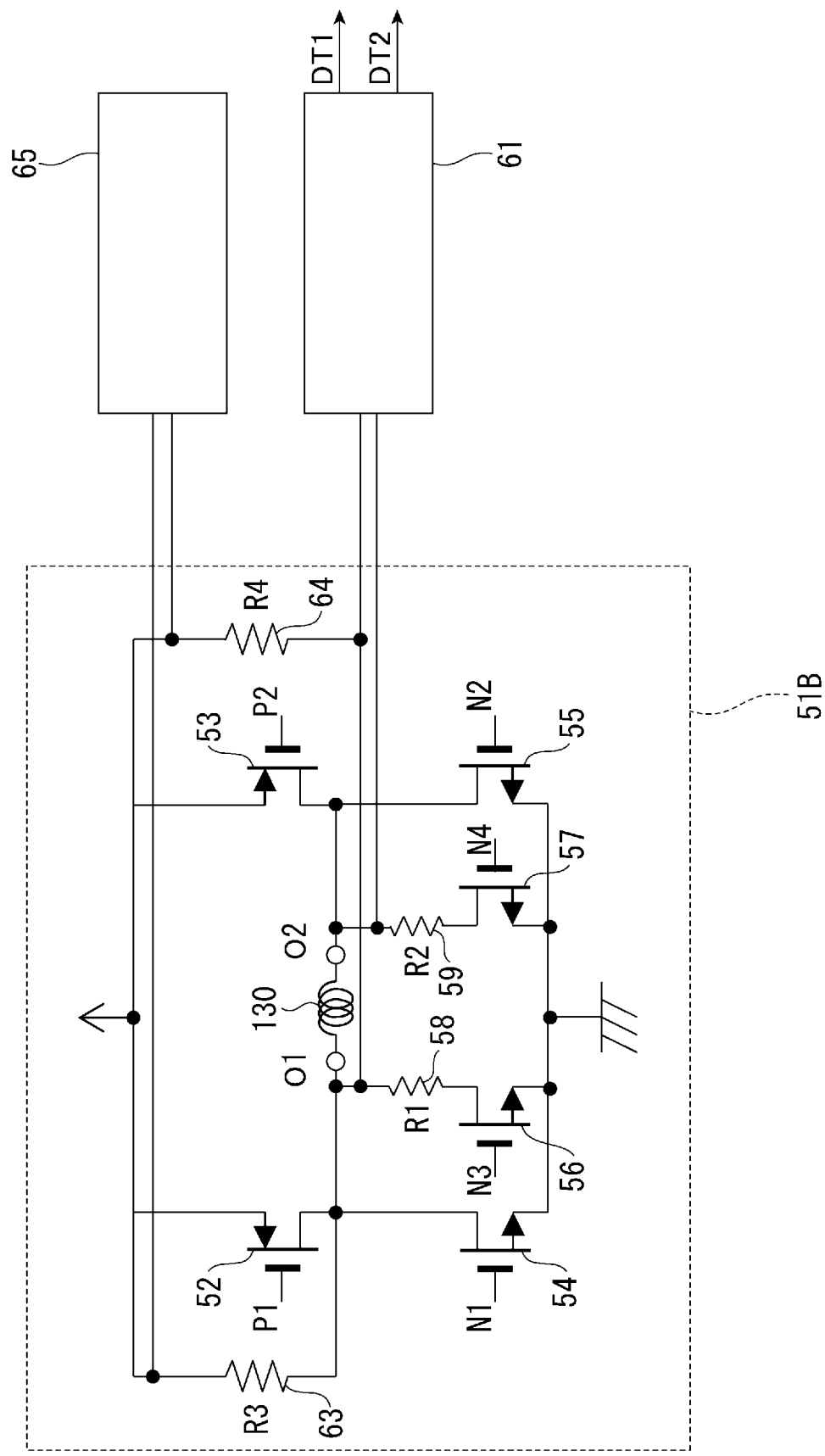
FIG. 10 is a circuit diagram of a driver in the second embodiment of the invention.

As shown in FIG. 10, except for having a detection resistor 63 of resistance R3 and a detection resistor 64 of resistance R4, the driver 51B is configured identically to the driver 51 of the first embodiment.

As shown in FIG. 10, the rotation detection circuit 65 detects rotation of the rotor by comparing the detection voltages of the detection resistor 63 of resistance R3 and the detection resistor 64 of resistance R4 with a reference voltage V.

The selector circuit 22, current control drive circuit 23, and current detection circuit 61 are the same as in the first embodiment, and further description thereof is omitted.

Figure 11:
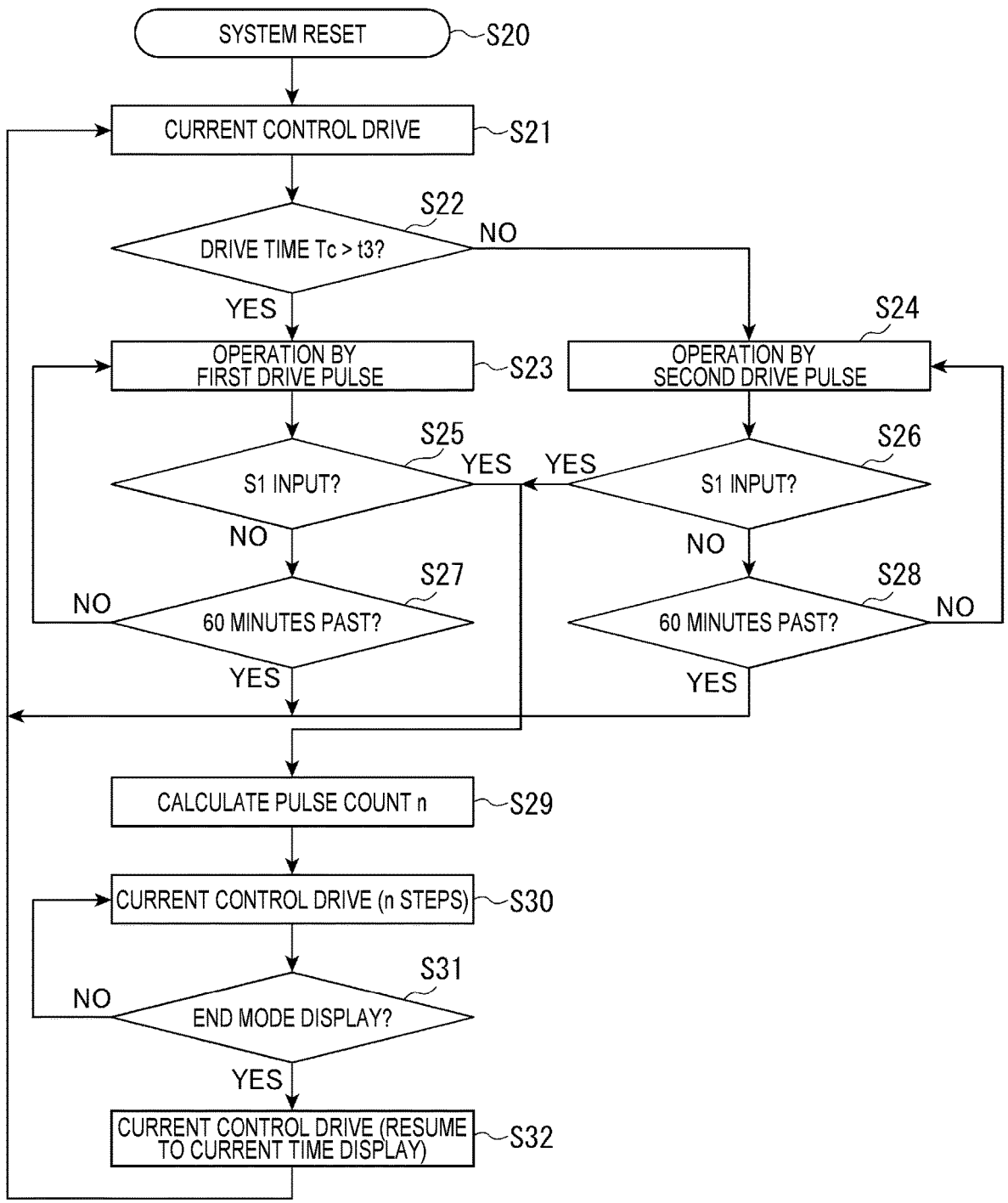
FIG. 11 is a flow chart of a motor drive control method in the second embodiment of the invention.

Control by the motor drive circuit 20B in this embodiment of the invention is described next with reference to the flow chart in FIG. 11 and the timing chart in FIG. 13.

When a system reset is triggered in step S20, the drive control circuit 21B of the motor drive circuit 20B first executes the current control drive process S21 by the current control drive circuit 23. This current control drive process S21 is the same as the current control drive process SA of steps S2 to S8 of the first embodiment shown in FIG. 5, and further description thereof is omitted.

Next, the current control drive circuit 23 executes an evaluation process S22 that determines whether or not the drive time Tc is longer than the evaluation time t3 in the same way as step S9 in the first embodiment.

A state evaluation process that determines the condition of the motor, or more specifically the size of the load on the motor, is embodied by the current control drive process S21 and evaluation process S22.

Based on the result from step S22, the drive control circuit 21B outputs a signal to the selector circuit 22, and the selector circuit 22 selects either the first drive pulse 73 output from the first rotation detection drive circuit 26 or the second drive pulse 75 output from the second rotation detection drive circuit 27 as the drive signal to input to the driver 51B.

If YES is returned in step S22, the selector circuit 22 executes step S23 and controls the operation by the motors by applying the first drive pulse 73 output from the first rotation detection drive circuit 26. More specifically, as shown in FIG. 12, the selector circuit 22 alternates the first drive pulse 73 between a first polarity and second polarity. For example, when driving the second hand 4, for example, the first drive pulse 73 is input every period T (=1 second). When driving the hour hand 2 and minute hand 3, the first drive pulse 73 is also input at the corresponding operation period.

As described above, after outputting the first drive pulse 73, the selector circuit 22 inputs the first detection pulse 74 output from the first rotation detection drive circuit 26 with the same polarity as the first drive pulse 73, and detects rotation of the rotor by the first detection pulse 74 after the first detection mask time Tm1 passes.

When non-rotation of the rotor is detected, the first rotation detection drive circuit 26 outputs a compensating drive pulse, and the selector circuit 22 inputs a compensating drive pulse of the same polarity as the first drive pulse 73, thereby reliably turning the rotor.

If NO is returned in step S22, the selector circuit 22 executes step S24 and controls the operation by the motors by applying the second drive pulse 75 output from the second rotation detection drive circuit 27. As shown in FIG. 13, the selector circuit 22 alternates the second drive pulse 75 between the second polarity and first polarity to drive the hour hand 2, minute hand 3, and second hand 4.

After inputting the second drive pulse 75, the selector circuit 22 then inputs the second detection pulses 76 output from the second rotation detection drive circuit 27, and rotation of the rotor is detected based on the second detection pulses 76 after the second detection mask time Tm2 passes.

When non-rotation of the rotor is detected, the second rotation detection drive circuit 27 outputs a compensating drive pulse, and the selector circuit 22 inputs a compensating drive pulse of the same polarity as the second drive pulse 75, thereby reliably turning the rotor.

While driving the operation by the first drive pulse 73 in step S23, or driving the operation by the second drive pulse 75 in step S24, the drive control circuit 21B executes step S25 or step S26 to evaluate whether or not the button B 11B instructing changing the operating mode was pushed and the switch signal S1 was input.

When NO is returned in step S25 or step S26, the drive control circuit 21B executes step S27 or step S28 respectively to determine whether or not 60 minutes have past since the start of the current control drive process S21. If NO is returned in step S27 or step S28, the drive control circuit 21B continues driving the operation in step S23 or step S24.

However, if YES is returned in step S27 or step S28, the drive control circuit 21B repeats the current control drive process S21. As a result, each 60 minutes after the system reset, the drive control circuit 21B drives the motors by the current control drive circuit 23 one step only, and continues driving the motors by the first drive pulse 73 or second drive pulse 75 that was selected by the current drive time Tc.

If the button B 11B is pushed and the switch signal S1 is input during operation of the hour hand 2, minute hand 3, and second hand 4, the drive control circuit 21B determines YES in step S25 and step S26, and executes step S29 to calculate the number of pulses n required to move the second hand 4 to the position indicating marker 15 or marker 16.

Next, the drive control circuit 21B sets the number of pulses n calculated in step S29 in the step count control circuit 36 of the current control drive circuit 23, and executes the current control drive process S30 n step times.

The current control drive circuit 23 can increase the frequency and drive the second hand 4 at a high speed by driving the stepper motor continuously to rapidly move the second hand 4. The second hand 4 moves quickly to the position indicating marker 15 when linking to an external device, and when a mail notification is received, the second hand 4 moves quickly to the position indicating marker 16.

Next, the drive control circuit 21B executes step S31 to determine whether or not to stop the mode display. For example, if the second hand 4 has indicated the mode for a specific time, the mode display may be exited, and if the button B 11B is pushed, the mode display may be exited. If NO is returned in step S31, the drive control circuit 21B continues to indicate the mode.

If YES is returned in step S31, the drive control circuit 21B executes the current control drive process S32 by the current control drive circuit 23 to return the second hand 4, which had been indicating the mode, to the normal time mode position.

Effect of Embodiment 2

During normal operation control of the hour hand 2, minute hand 3, and second hand 4, the drive control circuit 21B of the second embodiment first drives the motors by the current control drive circuit 23, and identifies a heavy load on the motors based on a drive result indicating the drive time Tc of current control exceeds a evaluation time t3, and can therefore appropriately select the drive pulse for continuing driving the motors.

As a result, when the load on the motors is determined to be high, the motors can be driven by the first drive pulse 73, which has a greater number of chopping pulses, and when the load is low, the motors can be driven by the first detection pulse 74, which has a smaller number of chopping pulses The motors can therefore be reliably driven and power consumption can be reduced when driving the operation normally. In other words, drive control of the motors by the current control drive circuit 23 consumes much current when driving the motors by single pulses, and achieving low current consumption is difficult when single pulses are used to drive the motors at the operation intervals of the hour hand 2 and minute hand 3 during normal operation of the movement.

Motor drive control by the current control drive circuit 23 in this embodiment of the invention, however, is applied once every 60 minutes to detect the motor load. At other times the current control drive circuit 23 controls driving the motors by the first rotation detection drive circuit 26 or second rotation detection drive circuit 27 according to the load on the motors. As a result, the motors can be driven reliably while also reducing power consumption.

More particularly, because rotation detection drive enables reliably driving by applying a compensating drive pulse when the rotor is not turning, there is no need to set a first drive pulse 73 and second drive pulse 75 that anticipate sudden load increases, the first drive pulse 73 and second drive pulse 75 can be set to the lowest level enabling driving the rotor during normal operation, and reduced power consumption can be easily achieved during normal operation of the movement.

First detection mask time Tm1 or second detection mask time Tm2 is selected according to the drive result of the first drive circuit, that is, the load on the motor. As a result, the rotation detection circuit 65 can reliably detect rotation of the rotor even when the load or temperature changes.

Because motor drive control by the current control drive circuit 23 is used when moving the second hand 4 to indicate a mode change, the second hand 4 or other indicator can be driven rapidly and the mode display can change in a short time.

Variations of Embodiment 2

In the second embodiment described above the detection mask time is set to either first detection mask time Tm1 or second detection mask time Tm2 according to the result of evaluating the drive time Tc during motor drive control by the current control drive circuit 23, but the pulse width of the first detection pulse 74 and second detection pulses 76 may be set according to the result of the evaluation.

For example, when the load on the stepper motor is determined to be high, the pulse width of the detection pulse is preferably shorter than when the load is determined to be low. Braking is more difficult in this case, but detection precision can be improved. However, the load on the stepper motor is determined to be low, the pulse width of the detection pulse is preferably longer than when the load is determined to be high. Braking is easier in this case, and operation of the rotor is stable.

Alternatively, when the number of pulses at which the induced EMF detected by the input of first detection pulse 74 or second detection pulses 76 exceeding the specific voltage V is compared with a specific threshold to determine whether the rotor is turning or not turning, the threshold for evaluation rotation, that is, the number of pulses, may be set based on the evaluation of the drive result.

For example, when the load on the stepper motor is determined to be high, detection can be improved if the threshold is lower than when the load is determined to be low. When the load on the stepper motor is determined to be low, false evaluations can be reduced and control stabilized if the threshold is greater than when the load is determined to be high.

The pulse count of the drive pulse is selected and set using a first drive pulse 73 and a second drive pulse 75 based on the evaluation result, but the pulse width or duty of the drive pulse may be set instead.

For example, if the pulse width of the drive pulse is increased or the duty is increased when the load on the stepper motor is determined to be high, current flow to the coil 130 can be increased and rotation of the rotor can be started more easily. However, by reducing the pulse width or reducing the duty of the drive pulse when the load on the motor is determined to be low, power consumption can be reduced.

In the second embodiment of the invention, the load on the motor is evaluated in two stages based on the drive time Tc, and a first rotation detection drive circuit 26 or a second rotation detection drive circuit 27 is selected, but multiple evaluation thresholds may be set and the motor load evaluated in three or more stages. This configuration enables setting the drive pulses and mask time for rotation detection in finer increments of three or more levels, and driving with narrower drive pulses selected according to the load on the motor. As a result, compared with conventional rotation detection control, driving a short time with pulses of the lowest current consumption is possible.

Evaluating the load on the motor by the current control drive circuit 23 is done at a regular interval, such as every 60 minutes in the second embodiment of the invention, but when rotation detection of the rotor based on the detection pulse determines the rotor is not turning, the motor load may be evaluated by the current control drive circuit 23. As a result, when the rotor cannot be turned by the selected drive pulse, the motor load can be evaluated again, the drive pulse can be changed to a more drive pulse to drive the motor, control outputting a compensating drive pulse when the rotor cannot be turned can be reduced, and power consumption can be reduced accordingly.

Embodiment 3

A third embodiment of the invention is described next with reference to FIG. 14 to FIG. 18. This third embodiment has a motor drive circuit 20C that controls the motors that drive the hour hand, minute hand, second hand, and other hands of an electronic timepiece not shown in the figures.

This motor drive circuit 20C is configured the same as the motor drive circuit 20B of the second embodiment, like parts in this and the configuration of the second embodiment described above are identified by like reference numerals and further description thereof is omitted.

This motor drive circuit 20C includes a drive control circuit 21C, a selector circuit 22, a current control drive circuit 23, a first rotation detection drive circuit 26, a second rotation detection drive circuit 27, a fixed pulse drive circuit 28, a driver 51B, a current detection circuit 61, and a rotation detection circuit 65.

In the motor drive circuit 20C of the third embodiment, the current control drive circuit 23 is a first drive circuit, the fixed pulse drive circuit 28 is a second drive circuit, the first rotation detection drive circuit 26 and second rotation detection drive circuit 27 are a third drive circuit, and the drive control circuit 21C and selector circuit 22 are control means.

Figure 16:
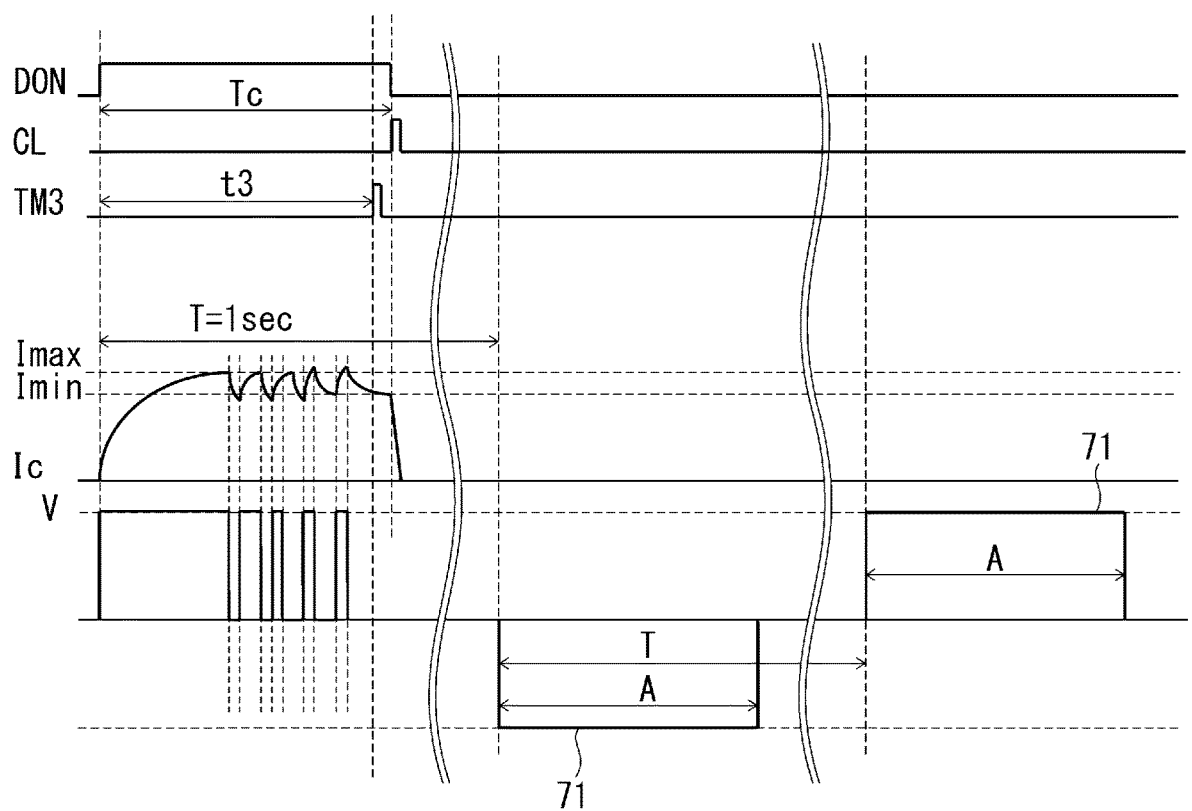
FIG. 16 is a timing chart of the operation of the motor drive control process in the third embodiment of the invention.
Figure 17:
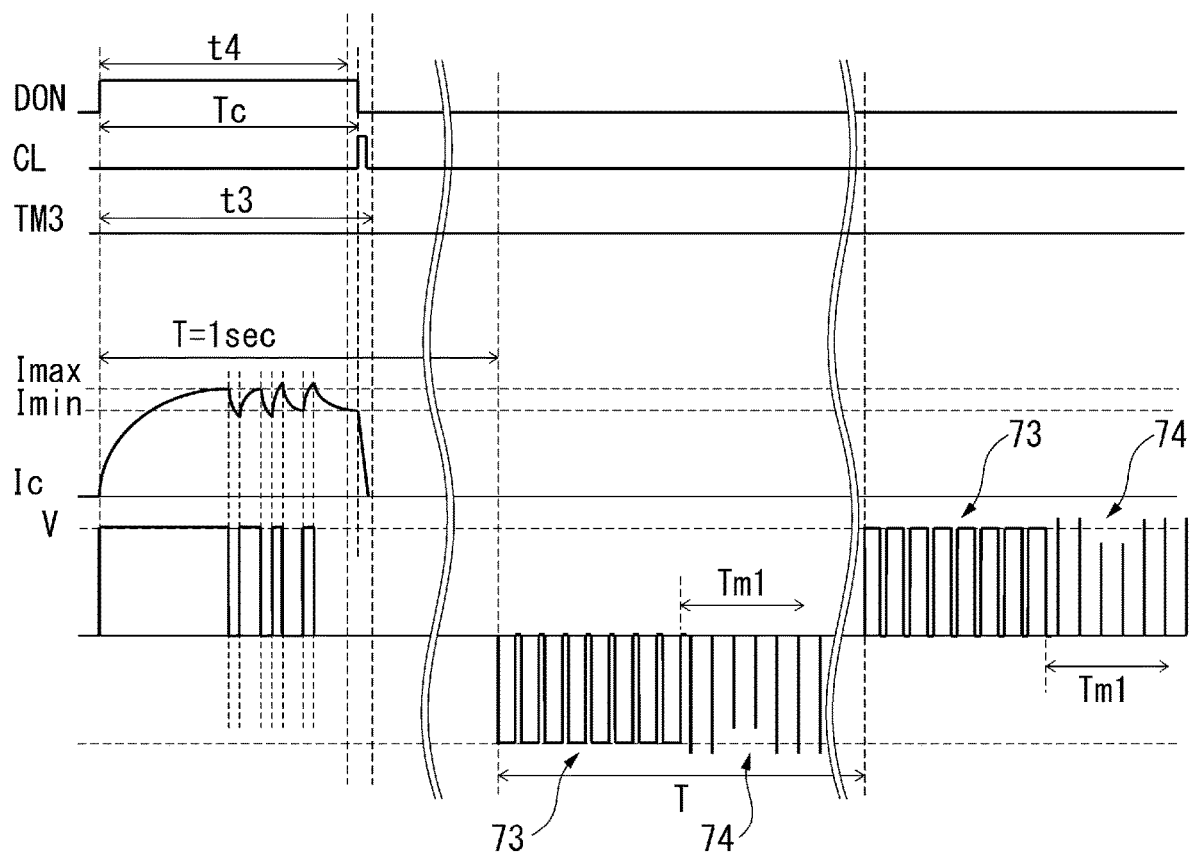
FIG. 17 is another timing chart of the operation of the motor drive control process in the third embodiment of the invention.
Figure 18:
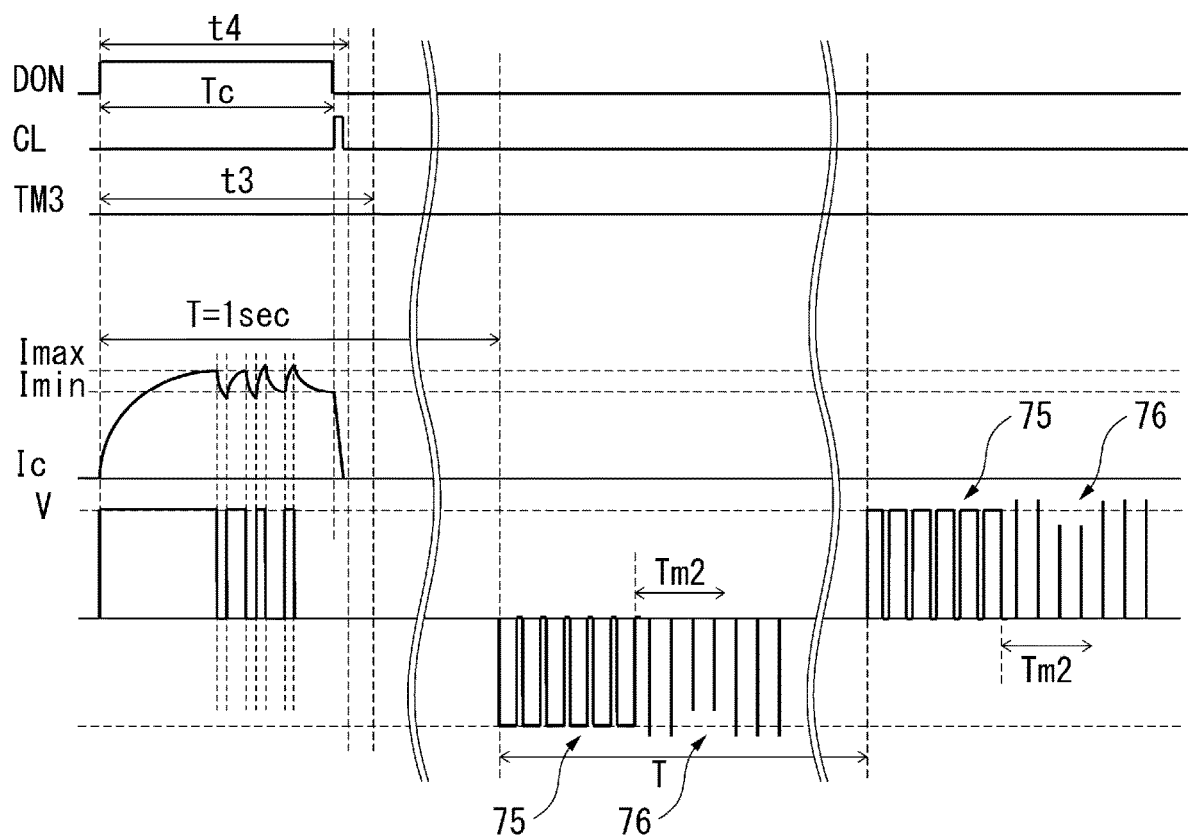
FIG. 18 is another timing chart of the operation of the motor drive control process in the third embodiment of the invention.

Control by the motor drive circuit 20C in this embodiment of the invention is described next with reference to the flow chart in FIG. 15 and the timing charts in FIG. 16 to FIG. 18.

Figure 15:
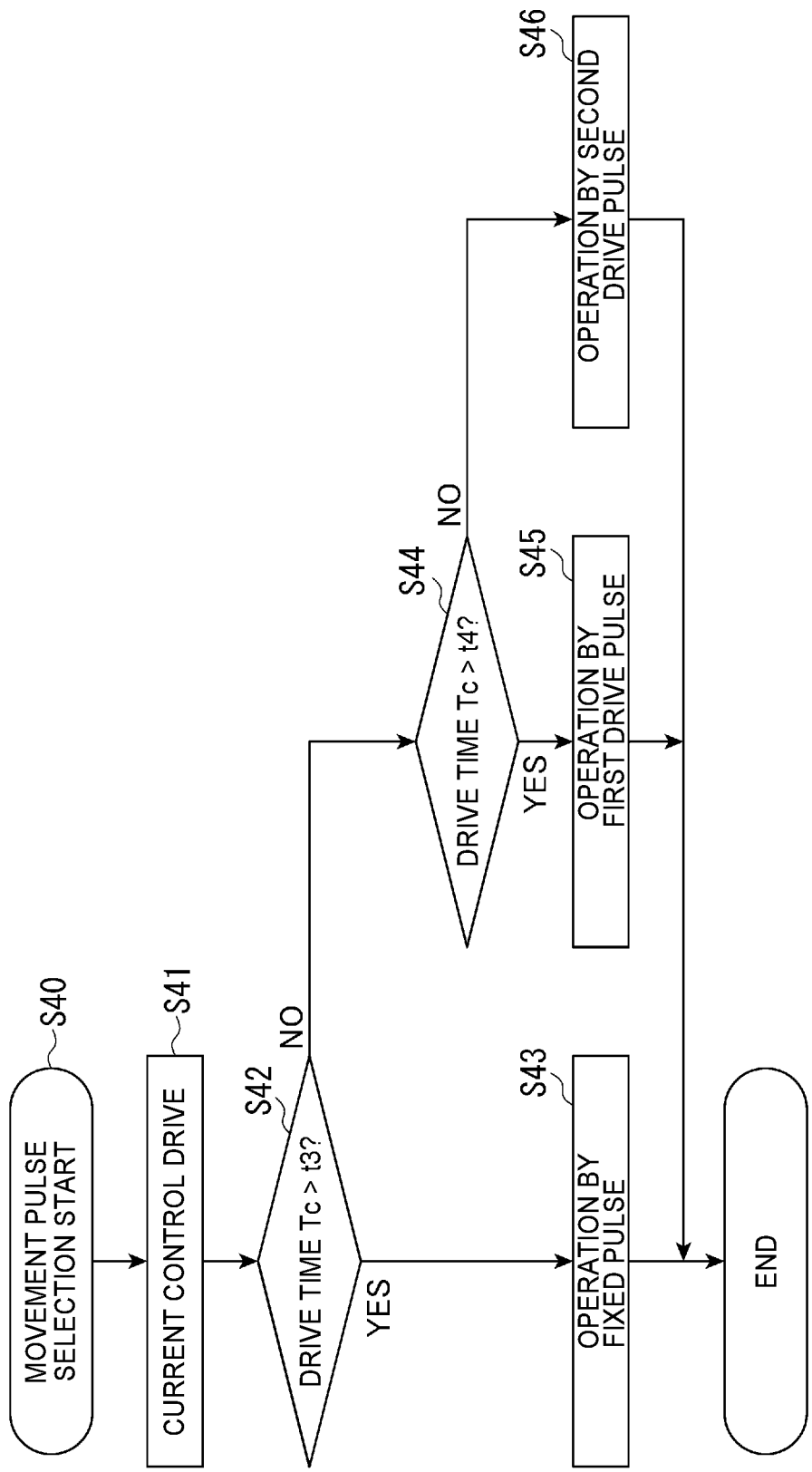
FIG. 15 is a flow chart of a motor drive control method in the third embodiment of the invention.

The drive control circuit 21C of the motor drive circuit 20C executes the operation pulse selection process S40 in FIG. 15 at a regular interval, which is 60 minutes in this example. The movement is then controlled by the pulse selected in the operation pulse selection process S40 until the next time the operation pulse selection process S40 executes.

When the operation pulse selection process S40 starts, the drive control circuit 21C executes the current control drive process S41 by the current control drive circuit 23. This current control drive process S41 is the same as the current control drive process SA of steps S2 to S8 of the first embodiment and the current control drive process S21 of the second embodiment, and further description thereof is omitted.

Next, the drive control circuit 21C executes an evaluation process S42 that determines whether or not the drive time Tc of the first step of the motor detected by the current control drive process S41 is longer than the evaluation time t3. This evaluation process S42 is the same evaluation process S9 in the first embodiment, and the evaluation process S22 in the second embodiment, and further description thereof is omitted.

If the drive control circuit 21C determines YES in step S42, it determines the load on the motor is high, instructs the selector circuit 22 to drive the operation by fixed pulse drive, and the selector circuit 22 executes the operation process S43 by fixed pulse drive.

In step S43 the selector circuit 22 controls by the motors by outputting a fixed pulse as a second drive signal output from the fixed pulse drive circuit 28. The fixed pulse drive circuit 28 outputs the same first fixed pulse 71 as the first fixed pulse drive circuit 24 of the first embodiment as the second drive signal. As shown in FIG. 16, the selector circuit 22 therefore inputs the first fixed pulse 71 output from the fixed pulse drive circuit 28 while alternating between the second polarity and first polarity. For example, to the motor that drives the second hand 4, the selector circuit 22 inputs the first fixed pulse 71 at period T=1 second to drive the second hand 4.

However, if NO is returned in S42, the drive control circuit 21C executes the evaluation process S44 to determine whether or not drive time Tc is longer than evaluation time t4. As shown in FIG. 18 and FIG. 18, evaluation time t4 is shorter than evaluation time t3, that is, is a previously set time. More specifically, in this embodiment the load on the motor is evaluated in three stages based on the drive time Tc, and the threshold is set so that t3>t4 is true for evaluation time t3 and evaluation time t4.

If YES is returned in step S44, that is, if drive time Tc is t3>Tc>t4, the drive control circuit 21C determines the load on the motor is at an intermediate level, and instructs the selector circuit 22 to control the operation by the first drive pulse 73. As shown in FIG. 17, the selector circuit 22 executes the operation process S45 of outputting the first drive pulse 73 and first detection pulse 74 from the first rotation detection drive circuit 26 to the driver 51B, and driving the operation by the first drive pulse 73, which is a third drive signal.

If NO is returned in S44, that is, if the drive time Tc is less than evaluation time t4, the drive control circuit 21C determines the load on the motor is a low level, and instructs the selector circuit 22 to drive the operation by the second drive pulse 75. As shown in FIG. 18, the selector circuit 22 executes a operation process S46 of outputting the second drive pulse 75 and second detection pulses 76 from the second rotation detection drive circuit 27 to the driver 51B, and driving the operation by the second drive pulse 75, which is a third drive signal.

The selector circuit 22 continues with the selected operation control until the operation pulse selection process S40 in FIG. 15 repeats. When the specific time, such as 60 minutes, has past, the drive control circuit 21C executes the operation pulse selection process S40 again, and selects operation control by either step S43, step S45, or step S46.

Effect of Embodiment 3

The third embodiment of the invention has the same effect as the second embodiment of the invention.

More specifically, the motor drive circuit 20C detects the load on the motor in three levels based on the drive time Tc detected by drive control by the current control drive circuit 23, and based on the detected level, selects a first fixed pulse 71, first drive pulse 73, or second drive pulse 75, thereby enabling reliably driving the motors while suppressing power consumption. As a result, the motor drive circuit 20C can drive various hands from thick to thin. Therefore, by incorporating the motor drive circuit 20C with a movement sold to a third party, the third party can use various types of hands, there is no need to design different control circuits to different hands, and cost can be reduced.

Because the motor load is small when the hands are small or thin, the motor can be controlled by rotation detection control by the first rotation detection drive circuit 26 and second rotation detection drive circuit 27. As a result, power consumption can be reduced and battery life can be increased.

When the hand is thick, the load on the motor also increases. As a result, if the hand is driven by the first rotation detection drive circuit 26 and second rotation detection drive circuit 27, turning the rotor may not be possible by the first drive pulse 73 or second drive pulse 75, a compensating drive pulse with a large pulse width capable of reliably turning the rotor is required, and current consumption increases. Therefore, when the motor load is high, fixed pulse drive enables reducing current consumption, and thereby increase battery life to some degree.

Furthermore, when the temperature of the environment in which the electronic timepiece 1 is used changes, or the electronic timepiece 1 is used for a long time and the load increases, the motor can be reliably driven because the motor drive pulse is selected according to the load.

Embodiment 4

A fourth embodiment of the invention is described next with reference to FIG. 19 and FIG. 20.

Figure 19:
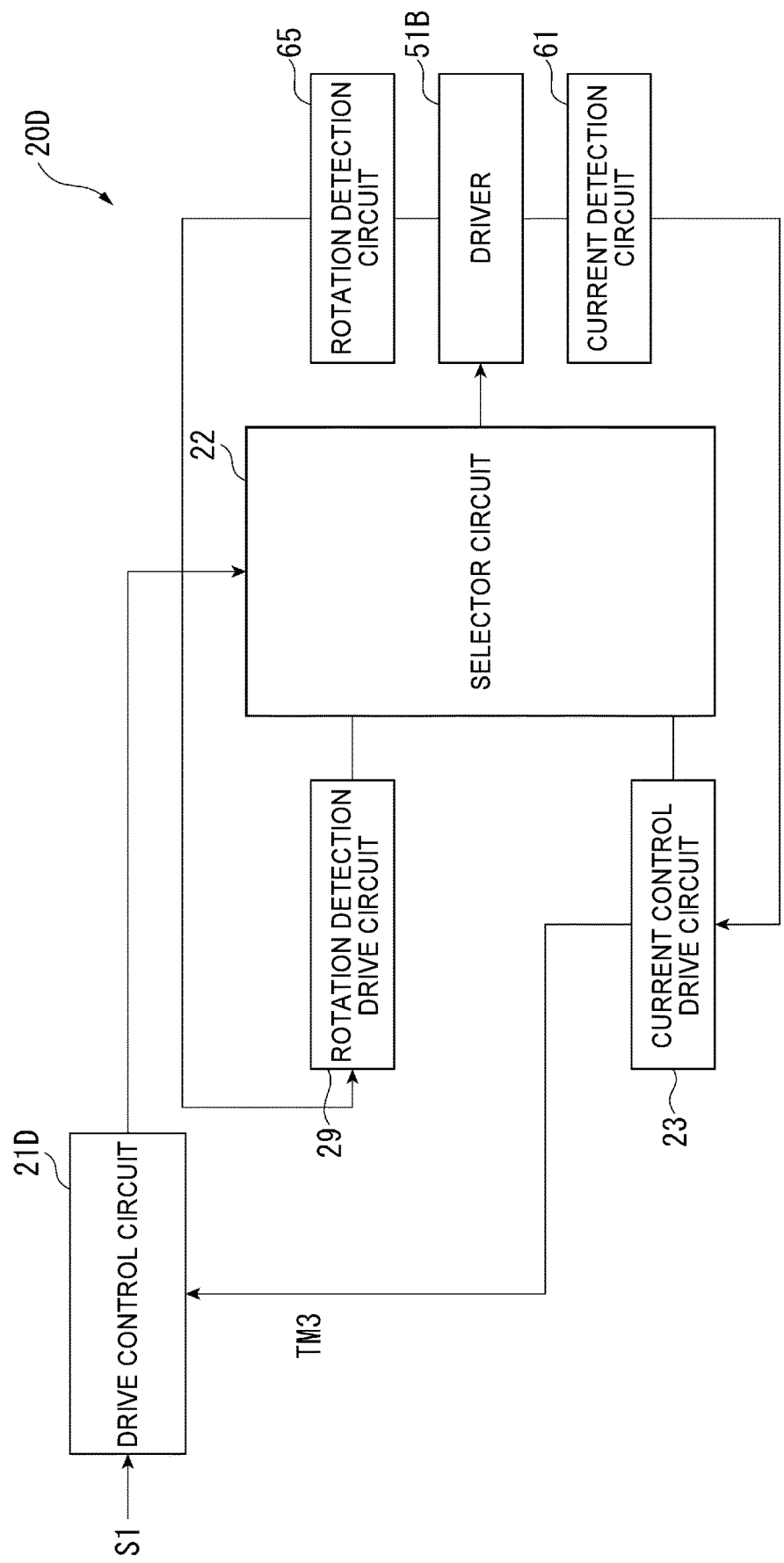
FIG. 19 is a block diagram illustrating the motor drive circuit of the fourth embodiment of the invention.
Figure 20:
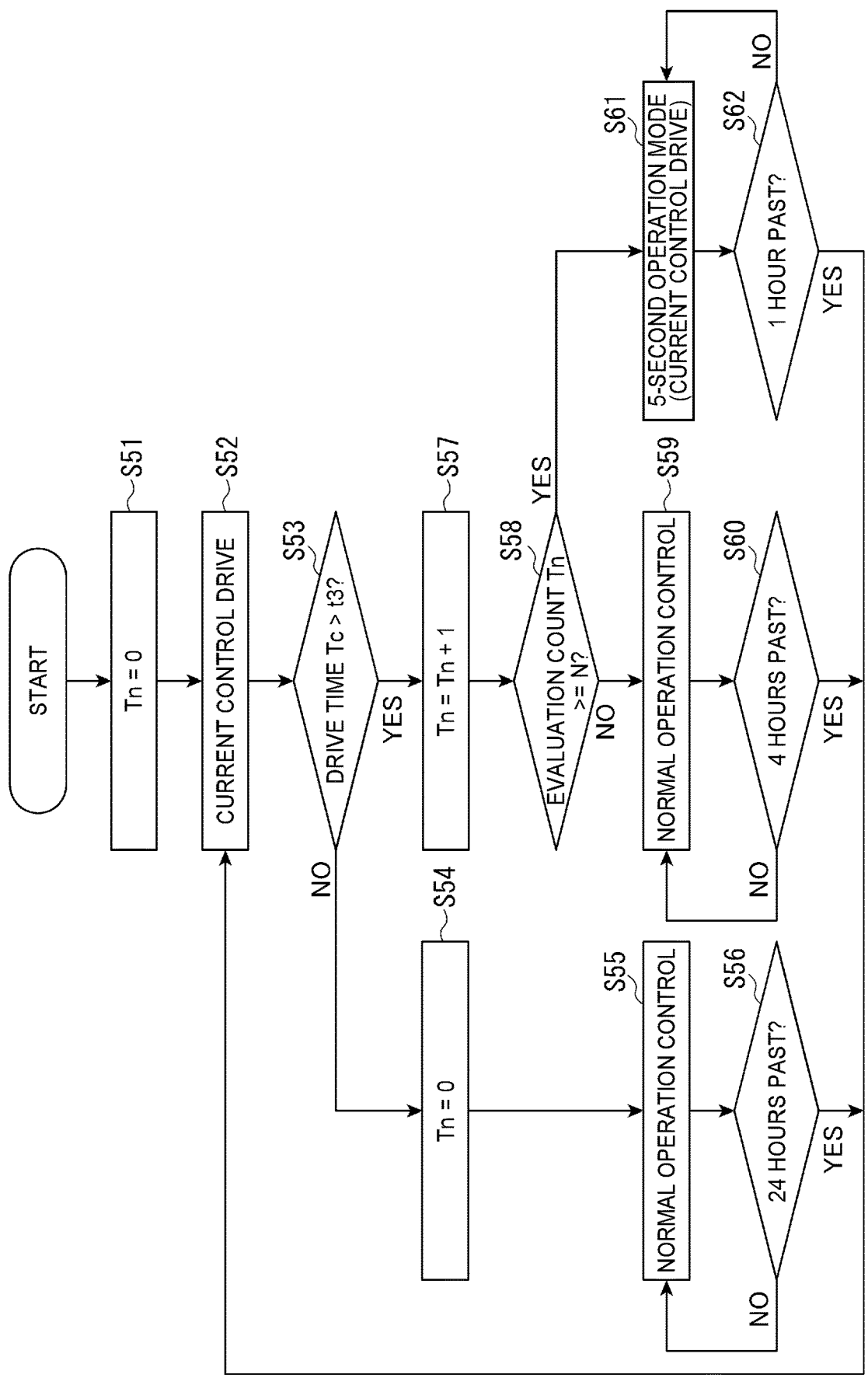
FIG. 20 is a flow chart of a motor drive control method in the fourth embodiment of the invention.

As shown in FIG. 19, this fourth embodiment of the invention evaluates the load level of the motor based on the drive time Tc by the current control drive circuit 23, determines an error has occurred if the load level remains continuously high, and notifies the user.

As in the second embodiment and third embodiment, this fourth embodiment has a motor drive circuit 20D that executes normal operation control controlling the motors that drive the hour hand, minute hand, second hand, and other hands of an electronic timepiece not shown in the figures.

The motor drive circuit 20D has the same configuration as the motor drive circuits 20B and 20C, like parts in this and the configuration of the motor drive circuits 20B, 20C are identified by like reference numerals, and further description thereof is omitted.

This motor drive circuit 20D has a drive control circuit 21D, selector circuit 22, current control drive circuit 23, rotation detection drive circuit 29, driver 51B, current detection circuit 61, and rotation detection circuit 65. In the motor drive circuit 20D of the fourth embodiment, the current control drive circuit 23 is a first drive circuit, the rotation detection drive circuit 29 is a second drive circuit, and the drive control circuit 21D and selector circuit 22 are control means.

Like the first rotation detection drive circuit 26 and second rotation detection drive circuit 27, the rotation detection drive circuit 29 outputs a detection pulse after outputting the drive pulse, detects if the rotor is turning or not turning after a specific detection mask time passes, and when non-rotation of the rotor is detected, outputs a compensating drive pulse to reliably turn the rotor. The rotation detection drive circuit 29 also controls increasing the current flow to the coil 130 of the motor so that the pulse count of the comb-shaped drive pulse increases, or the duty increases, to reliably turn the rotor.

If rotation of the rotor is detected, the rotation detection drive circuit 29 reduces the pulse count or reduces the duty of the drive pulse, reducing the current flow to the coil 130 when turning the rotor and reducing current consumption when driving the motor.

Control by the motor drive circuit 20D according to this embodiment is described next with reference to the flow chart in FIG. 20.

The drive control circuit 21D of the motor drive circuit 20D first sets the count Tn indicating the number of abnormal evaluations to an initial value of 0 in step S51.

Next, in step S52, the drive control circuit 21D applies current drive control. As in the foregoing embodiments, in current drive control the drive control circuit 21D outputs a control signal to the selector circuit 22, and the selector circuit 22 sends to the driver 51B a signal for current control that is output from the current control drive circuit 23.

Next, in step S53, the drive control circuit 21D determines whether or not the drive time Tc is longer than the evaluation time t3 based on the output TM3 of the third timer 33 output from the current control drive circuit 23.

If NO is returned in step S53, the drive control circuit 21D initializes the count Tn to 0 in step S54. Then in step S55 the drive control circuit 21D controls the motor in the normal operation mode. In step S55, the drive control circuit 21D instructs the selector circuit 22 to control the operation by the rotation detection drive circuit 29. The selector circuit 22 outputs the drive pulse and detection pulse output from the rotation detection drive circuit 29 to the driver 51B for rotation detection drive control of the motor.

Each time the motor is controlled to move one step in step S55, the drive control circuit 21D in step S56 determines if 24 hours have past since normal operation drive started in step S55. If NO is returned in step S56, the drive control circuit 21D continues normal operation control in step S55. If YES is returned in step S56, the drive control circuit 21D again applies current control drive in step S52.

As a result, if the motor load is small and NO is returned in step S53, the drive control circuit 21D evaluates the level of the load on the motor by current control drive of step S52 every 24 hours, and if the load level is low, continues controlling the operation by the rotation detection drive circuit 29 according to step S55.

If YES is returned in step S53, the drive control circuit 21D adds 1 to the count Tn in step S57. Next, in step S58, the drive control circuit 21D determines whether or not count Tn is greater than or equal to evaluation count N.

If step S58 returns NO, the drive control circuit 21D executes step S59 and step S60. Normal operation control in step S59 is the same as in step S55, and further description thereof is omitted.

Each time the motor is controlled to move one step in step S59, the drive control circuit 21D in step S60 determines if 4 hours have past since normal operation drive started in step S59. If NO is returned in step S60, the drive control circuit 21D continues normal operation control in step S59. If YES is returned in step S60, the drive control circuit 21D again applies current control drive in step S52.

As a result, if the motor load is intermediate, YES is returned in step S53, and the count Tn is less than evaluation count N, the drive control circuit 21D applies current control drive by step S52 every four hours. If in step S53 the drive time Tc is determined to be longer than evaluation time t3, normal control of the operation by the rotation detection drive circuit 29 continues in step S59 until the count Tn is greater than or equal to evaluation count N.

The evaluation count N is set appropriately according to the timing when a problem is reported, for example, and in this example is set to N=4. In this example, once Tn is set to 1 in step S57, count Tn is incremented by 1 every four hours in step S57, Tn=4 when 12 hours have past, and drive control circuit 21D then returns YES in step S58.

When YES is returned in step S58, the drive control circuit 21D moves to a 5-second operation mode by current control drive in step S61. The 5-second operation mode is a mode for moving the second hand 4 a 5-second increment every five seconds. In step S61, the drive control circuit 21D outputs to the selector circuit 22 a control signal instructing implementing the 5-second operation mode by current control drive. The selector circuit 22 outputs the drive pulse output from the current control drive circuit 23 to the driver 51B, and executes the 5-second operation mode rapidly advancing the second hand 4 a 5-second increment every five seconds.

Each 5-second operation is controlled in step S61, the drive control circuit 21D determines in step S62 whether one hour has past. In step S62 the drive control circuit 21D determines whether or not one hour has past since 5-second operation control started in step S61. If NO is returned in step S62, the drive control circuit 21D operation control in step S61. If YES is returned in step S62, current control drive resumes in step S52.

Effect of Embodiment 4

The fourth embodiment of the invention has the same effect as the second and third embodiments of the invention.

When a high motor load state continues for a specific time, such as 12 hours or more, the drive control circuit 21D implements 5-second operation control and notifies the user of an error. As a result, the user can be made aware of problems, and thereby know that maintenance of the electronic timepiece is required.

Variations of Embodiment 4

In the fourth embodiment, the times counted in step S56, step S60, and step S62 are, respectively, 24 hours, 4 hours, and 1 hour, and the interval to use is set in the current control drive process S52, but the interval for executing step S52 is not limited thereto. For example, the same times may be set in step S56, step S60, and step S62, or set appropriately according to the evaluation conditions applied in step S53 and step S58.

The conditions for evaluating problems are not limited to those described in the foregoing embodiment. For example, if YES is returned in step S53, the 5-second operation control may be implemented immediately in step S61, and an error reported.

The method of reporting an error is also not limited to 5-second operation of the second hand 4. For example, a hand for indicating errors may be provided, a dedicated operation may be provided, or a condition other than normal may be used to inform the user.

OTHER EXAMPLES

The invention is not limited to the embodiments described above, and can be modified and improved in many ways without departing from the scope of the accompanying claims.

For example, the current control drive processes SA, S21, S41, S52 of the current control drive circuit 23 that detect the load on the stepper motor in the foregoing embodiments are applied for one step only, that is, for only the first polarity or second polarity, but the load may be evaluated based on two steps, including a first polarity and a second polarity.

If the evaluation of the load differs with the first polarity and the second polarity, the evaluation may be repeated based on the results with a pulse input with the first polarity and a pulse input with the second polarity. For example, in the first embodiment, when the drive time Tc is greater than the evaluation time t3 in the current control drive process SA using the first polarity, and the drive time Tc is less than or equal to the evaluation time t3 in the current control drive process SA based on the second polarity, the operation may be driven by a first fixed pulse 71 of the first polarity, and then driven by a second fixed pulse 72 of the second polarity. In other words, the operation may be controlled by alternately inputting the first fixed pulse 71 and second fixed pulse 72.

In the embodiments described above, the chronograph operation control circuit 21 and drive control circuits 21B, 21C, 21D evaluate the results of driving by the current control drive circuit 23, which is a first drive circuit, but may be configured to count the drive time Tc by the current control drive circuit 23, and evaluate the drive result based on the drive time Tc. More specifically, the chronograph operation control circuit 21, and drive control circuits 21B, 21C, 21D may be configured to read and compare the value of the drive time Tc from the current control drive circuit 23 with the evaluation time t3 stored in a storage device not shown to evaluate the result of driving by the current control drive circuit 23.

The first rotation detection drive circuit 26 and second rotation detection drive circuit 27 of the second and third embodiments, like the rotation detection drive circuit 29 of the fourth embodiment, adjust the number of pulses, the pulse width, or the duty of the drive pulses output after non-rotation of the rotor is detected, and each time non-rotation is detected, controls increasing the torque of the stepper motor in stages.

When rotation of the rotor is detected, the pulse count, pulse width, or duty of the drive pulses output thereafter may be adjusted to gradually reduce the torque of the stepper motor in stages.

The current control drive process of the current control drive circuit 23 is not limited to the processes described in the foregoing embodiments. More specifically, the current control drive circuit 23 may be configured in any way appropriate to controlling the driver 51, 51B based on the current flow through the coil 130.

For example, the current control drive circuit 23 may be configured with a first detection means that detects if the current flow through the coil 130 is less than a first current level (minimum current), and a second detection means that detects if the current flow through the coil 130 is greater than a second current level (maximum current), and turn the driver 51, 51B ON if the current flow through the coil 130 goes below the first current level, and turn the driver 51, 51B OFF if the current flow through the coil 130 goes above the second current level.

When detection by the second detection means indicates the current flow through the coil 130 is greater than the second current level, the driver 51, 51B may be turned OFF, and the driver 51, 51B turned ON when the current flow through the coil 130 detected by the first detection means a specific time after the driver 51, 51B is turned OFF is greater than the second current level.

In addition, the result of driving by the current control drive circuit 23, the first drive circuit, is not limited to the drive time Tc, and may be the ON time or OFF time of the driver 51, 51B by the current control drive circuit 23, or a combination of the drive time Tc, ON time, and OFF time.

In the embodiments described above the electronic timepiece 1 is described as a wristwatch type device, but may be a mantle clock or wall clock, for example. In addition, the motor drive circuit of the invention is not limited to controlling motors that drive the hands of the timepiece, and may be applied to a motor drive circuit for hands that measurement values on various types of meters.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A movement comprising:
    a stepper motor having a coil and a rotor;
    a driver configured to supply to the coil of the stepper motor a drive current corresponding to an input drive signal to drive the rotor;
    a current detection circuit configured to detect a current value of the drive current flowing in the coil;
    a first drive circuit configured to output a first drive signal to the driver based on the current value detected by the current detection circuit;
    a second drive circuit configured to output a plurality of second drive signals to the driver, periods of time for supplying the drive current being different among the plurality of second drive signals; and
    a controller configured to select, based on a driving result of the stepper motor driven by the first drive signal from the first drive circuit, one of the plurality of second drive signals and supply the selected one of the plurality of second drive signals to the driver to drive the stepper motor,
    wherein the plurality of second drive signals includes a first drive pulse and a second drive pulse, and a period of time for supplying the drive current of the first drive pulse is longer than a period of time for supplying the drive current of the second drive pulse,
    the second drive circuit has a rotation detection circuit configured to detect rotation of the rotor of the stepper motor,
    the controller is configured to:
        select the first drive pulse as the input drive signal when the driving result of the stepper motor driven by the first drive signal satisfies a first predetermined condition; and
        select the second drive pulse as the input drive signal when the driving result of the stepper motor driven by the first drive signal satisfies a second predetermined condition, and
    the second drive circuit is configured to output a predetermined compensating drive pulse as the input drive signal when the rotation detection circuit detects that the rotor is not rotated after the input signal corresponding to the second drive signal is supplied to the stepper motor.

2. The movement according to claim 1,
    wherein the controller is configured to set a rotation detection condition of the rotation detection circuit based on the driving result of the stepper motor driven by the first drive signal from the first drive circuit.

3. The movement according to claim 1,
    wherein, after the second drive circuit outputs the predetermined compensating drive pulse as the input drive signal and the rotation detection circuit detects that the rotor is rotated, the controller is configured to cause the first drive circuit to output the first drive signal to drive the stepper motor.

4. The movement according to claim 1,
    wherein the controller causes the first drive circuit to output the first drive signal to the driver at a regular interval to drive the stepper motor, and
    after the stepper motor is driven by one of the first drive signals, the controller causes the second drive circuit to output one of the plurality of second drive signals to drive the stepper motor until the first drive circuit outputs a next one of the first drive signals.

5. The movement according to claim 1,
    wherein, when a period of time from starting driving of the stepper motor by the first drive signal from the first drive circuit until a current flow direction of the drive current flowing in the coil is changed is longer than a predetermined period of time, the controller determines that the driving result satisfies the first predetermined condition.

6. The movement according to claim 1,
    wherein, when a period of time from starting driving of the stepper motor by the first drive signal from the first drive circuit until a current flow direction of the drive current flowing in the coil is changed is equal to or shorter than a predetermined period of time, the controller determines that the driving result satisfies the second predetermined condition.

7. The movement according to claim 1,
    wherein the controller is configured to detect an error state based on the driving result of the stepper motor driven by the first drive signal from the first drive circuit.

8. The movement according to claim 1,
    wherein the driving result of the stepper motor driven by the first drive signal from the first drive circuit corresponds to a period of time from starting driving of the stepper motor by the first drive signal from the first drive circuit until a current flow direction of the drive current flowing in the coil is changed.

9. An electronic timepiece comprising:
    a dial;
    a hand disposed over the dial, the hand being movable with respect to the dial;
    the movement according to claim 1; and
    a case housing the dial, the hand, and the movement.

10. The movement according to claim 2,
    wherein the rotation detection condition is a detection mask time, a detection pulse width, or a detection pulse count.

11. A motor drive control method of driving a stepper motor, comprising:
    detecting a current value of a drive current flowing in a coil of the stepper motor;
    supplying a first drive signal to drive the stepper motor based on the detected current value;
    determining a driving result of the stepper motor driven by the first drive signal;
    supplying a first drive pulse of a plurality of first drive signals to drive the stepper motor when the driving result of the stepper motor driven by the first drive signal satisfies a first predetermined condition;
    supplying a second drive pulse of the plurality of second drive signals to drive the stepper motor when the driving result of the stepper motor driven by the first drive signal satisfies a second predetermined condition, a period of time for supplying the drive current of the first drive pulse being longer than a period of time for supplying the drive current of the second drive pulse; and supplying a predetermined compensating drive pulse to drive the stepper motor when a rotor of the stepper motor is not rotated after the first drive pulse or the second drive pulse is supplied to the stepper motor.

12. A movement comprising:
a stepper motor having a coil and a rotor;
a driver configured to supply to the coil of the stepper motor a drive current corresponding to an input drive signal to drive the rotor;
a current detection circuit configured to detect a current value of the drive current flowing in the coil;
a first drive circuit configured to output a first drive signal to the driver based on the current value detected by the current detection circuit;
a second drive circuit configured to output a plurality of second drive signals to the driver, drive pulse widths being different among the plurality of second drive signals; and
a controller configured to select, based on a driving result of the stepper motor driven by the first drive signal from the first drive circuit, one of the plurality of second drive signals and to supply the selected one of the plurality of second drive signals to the driver to drive the stepper motor,
wherein the plurality of second drive signals includes a first drive pulse and a second drive pulse, and a first drive pulse width of the first drive pulse is larger than a second drive pulse width of the second drive pulse,
the controller is configured to:
    select the first drive pulse as the input drive signal when the driving result of the stepper motor driven by the first drive signal satisfies a first predetermined condition; and
    select the second drive pulse as the input drive signal when the driving result of the stepper motor driven by the first drive signal satisfies a second predetermined condition,
when a period of time from starting driving of the stepper motor by the first drive signal from the first drive circuit until a current flow direction of the drive current flowing in the coil is changed is longer than a predetermined period of time, the controller determines that the driving result satisfies the first predetermined condition, and
when the period of time from starting driving of the stepper motor by the first drive signal from the first drive circuit until the current flow direction of the drive current flowing in the coil is changed is equal to or shorter than the predetermined period of time, the controller determines that the driving result satisfies the second predetermined condition.

* * * * *